US012764151B2

(12) United States Patent
Lingaraju et al.

(10) Patent No.: US 12,764,151 B2
(45) Date of Patent: Oct. 13, 2026

(54) SYSTEMS AND METHODS FOR GENERATING EMBEDDINGS OF NETWORK EVENT DATA TO DETECT FRAUDULENT BEHAVIOR IN NETWORKED ENVIRONMENTS

(71) Applicant: Stripe, Inc., South San Francisco, CA (US)

(72) Inventors: Yashu Lingaraju, Brier, WA (US); Stathis Vafeias, San Francisco, CA (US); Chiranth Hegde, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 68 days.

(21) Appl. No.: 18/987,883

(22) Filed: Dec. 19, 2024

(65) Prior Publication Data

US 2026/0163897 A1 Jun. 11, 2026

(30) Foreign Application Priority Data

Dec. 10, 2024 (GR) .................................... 00005761

(51) Int. Cl.

| | |
|---|---|
| *G06F 21/57* | (2013.01) |
| *H04L 9/40* | (2022.01) |
| *H04L 41/16* | (2022.01) |

(52) U.S. Cl.
CPC .......... *H04L 63/1425* (2013.01); *H04L 41/16* (2013.01)

(58) Field of Classification Search
None
See application file for complete search history.

(56) References Cited

U.S. PATENT DOCUMENTS 11,593,639 B1 * 2/2023 Garg .................. G06F 18/2415

* cited by examiner

*Primary Examiner* — William J. Goodchild
(74) *Attorney, Agent, or Firm* — Foley & Lardner LLP

(57) ABSTRACT

Presented herein are systems and methods of generating embeddings for network events to detect fraudulent activities in networked environments. A service may receive a request to execute a first network operation in a network environment. The service may identify an event dataset associated with the first network operation to be executed. The service may apply the first event dataset to a machine learning (ML) model comprising a plurality of weights. The ML model may be established using training data comprising (i) a first sample event dataset associated with a second network operation and (ii) a second sample event dataset corresponding to a modification of a portion of the first sample event dataset. The service may generate, based on applying the event dataset of the first network operation to the ML model, a plurality of embeddings indicative of fraudulence of the first network operation.

20 Claims, 10 Drawing Sheets

SYSTEMS AND METHODS FOR GENERATING EMBEDDINGS OF NETWORK EVENT DATA TO DETECT FRAUDULENT BEHAVIOR IN NETWORKED ENVIRONMENTS

CROSS-REFERENCE TO RELATED APPLICATIONS

This application claims priority to Greek patent application Ser. No. 000005761, filed Dec. 10, 2024, which is incorporated herein by reference in its entirety for all purposes.

TECHNICAL FIELD

The present application is generally related to using machine learning models to control network operations associated with computing systems in networked environments.

BACKGROUND

A computer system may transmit a request to access resources on a server over a computer networked environment. The resources may be protected and may include data only accessible to authorized computing systems. Certain requests may be malicious, fraudulent, or otherwise unauthorized attempt to access the resources on the server. These types of requests may contain information indicative of unauthorized attempts at accessing the server's resources. To protect these resources, the server may parse and inspect the contents of the request to determine whether the request is malicious, fraudulent, or otherwise unauthorized attempt to access the resources on the server. If the request is determined to be malicious, the server may reject the request as unauthorized and block access to the resources. Checking requests individually, however, may be unable to detect patterns of malicious behavior over a wide range of time. In addition, this approach can involve significant consumption of computing resources on the part of the server when processing each individual request.

SUMMARY

Presented herein are systems and methods for generating embeddings of network event data to detect fraudulent activities in networked environments. In a networked environment, a computing system may attempt to access resources hosted on a server. To access the resources, the computing system may transmit a set of requests to execute network operations to a server. Some requests may include data from an end-user device specifying various attributes for the execution of the network operations, whereas other requests may include data originating from the computing system itself also specifying the attributes for execution of the network operations. Upon the receipt of each request, the server in turn may process the request to carry out the specified network operation and return a response to the computing system.

As part of the processing of each individual request, the server may perform a check to determine whether the request is authorized and thus is permitted to pass through for additional processing to carry out the network operation. Certain requests to execute network operations may be attempts by malicious or fraudulent entities to access the resources of the server. The server may use a machine learning model to determine the request is an unauthorized attempt to access the resources of the server. The machine learning model may have been trained using training data including previous requests labeled as fraudulent or non-fraudulent. The inputs for the machine learning model may include numerical representation of the request and its contents (e.g., via enumeration), and the output may include an indication of whether the request is fraudulent or non-fraudulent. By applying the machine learning model to the new request, the server may determine whether the request is authorized and enact countermeasures accordingly.

There may be a number of technical drawbacks with this approach. For one, this approach may take a rather myopic view of requests individually, without factoring across multiple requests from the computing system. The machine learning model itself may struggle with training and providing accurate prediction due to their dependence on labeled data and a limited view of requests as isolated events. For another, by converting the request into a numerical representation, this approach may lack the ability to capture sequential patterns of requests and all contextual data. As a result, the machine learning model may be unable to recognize subtle changes in the data (e.g., modifications or inversions in letters in identifiers) or evolving tactics that are indicative of fraudulent behavior. One way to alleviate this issue may include frequently retraining the machine learning model to adapt to new tactics, but this may be a time and resource-intensive effort on the part of the machine learning model. All in all, the approach may be unable to uncover patterns that deviate from normal behavior, due to its evaluation of individual requests independently of other requests and data.

To address these and other technical issues, the server may use an embedding model to generate embeddings from requests and contextual data, along with an evaluation model to detect whether the requests are fraudulent using the embeddings. The embedding model may be a machine learning model (e.g., a transformer-based model) trained using unsupervised and weakly supervised training to generate embeddings as features for the evaluation of a set of requests over time. The training data for the embedding model may include the requests themselves and raw context data (e.g., network activity, attributes, and identifiers associated with originating computing systems) in string as opposed to their numerical representation. To encode semantic representations into the embeddings, the server may employ mask learning by obfuscating portions of the training data. The server may use the obfuscated portions of the training data to train the embedding model to reconstruct the corresponding original portions of the data. The server may further fine-tune the embedding model using contrastive learning by adding slight perturbations into the training data. For instance, the server may modify an email address from "joe123@example.com" to "joe 1244@example.com" included in the context data of the training data. By using the training data with the perturbations, the server may train the embedding model to output more similar embeddings for meaningfully similar input data, and conversely more dissimilar embeddings for meaningfully dissimilar input data.

In addition, the evaluation model may be a machine learning model to detect fraudulent behavior using the embeddings generated by the embedding model from the requests and associated context data. The evaluation model may be trained according to supervised learning to use the embeddings generated by the embedding model to detect fraudulence of requests coming from a given computing system. The training data for the evaluation model may include embeddings labeled as one of fraudulent or non-fraudulent. For instance, some of the requests used in the training data for the embedding model may have been previously identified as fraudulent, and thus labeled as fraudulent in the training data for the evaluation model. The evaluation model may take the embeddings in sequence from the embedding model as input and may output a likelihood of fraudulence of the requests using the embeddings in sequence.

With the establishment of the models, when a request to execute a network operation is received from a computing system, the server may aggregate context data associated with the request and the computing system. The data may include raw string data with information about the request or the computing system, such as network activity, transaction history, or identifiers, among others. The server may apply the context data to the embedding model to output embeddings. The embeddings may semantically represent the data for the evaluation of whether the requests are indicative of fraudulent behavior. Over time, the server may receive additional requests from the computing system, retrieve context data for each request, and generate the embeddings by applying the data to the embedding model.

The server may apply the set of embeddings generated by the embedding model to the evaluation model to determine a likelihood of fraudulent behavior by the computing system. Based on a comparison of the likelihood with a threshold, the server may control the network operation and communications with the computing system. When the likelihood is greater than or equal to the threshold, the server may detect fraudulent behavior on the part of the computing system. The server may also restrict the performance of the requested network operations, such as blocking the request or re-routing the request for further inspection. In contrast, when the likelihood is less than the threshold, the server may detect a lack of fraudulent behavior on the part of the computing system. The server may also permit the performance of the requested network operations.

In this manner, the server may be able to detect a wider range of fraudulent behavior by evaluating request and context data over a wider range of time and in sequence, relative to approaches that rely on independently analyzing individual requests. The use of unsupervised learning may allow the embedding model to be trained on a greater volume of training data, as unlabeled training data may be more readily available than labeled training data. The use of masked and contrastive learning may allow for the generative model to generate embeddings encoded with semantically meaningful features to facilitate evaluation of whether the requests represent fraudulent behavior. With these types of training, the embeddings generated by the generative model can capture non-linear relationships among different string data.

Additionally, embeddings may provide a way to represent categorical data in a continuous space more efficiently, improving model discrimination. The capture of contextual and temporal information in the embeddings may make such embeddings more effective in identifying fraudulent patterns, especially for computing system with high number of requests with the server. By detecting a wider range of fraudulent behavior, the server may improve network security, as more malicious and fraudulent entities are blocked from accessing resources. Furthermore, the use of the embedding model along with the evaluation model also may alleviate having to frequently retraining models to detect fraudulent behavior, thereby conserving computing resources (e.g., processing and memory consumption).

Aspects of the present disclosure may be directed to systems and methods of generating embeddings for network events to detect fraudulent activities in networked environments. One or more processors may receive a request to execute a first network operation in a network environment. The one or more processors may identify an event dataset associated with the first network operation to be executed. The one or more processors may apply the first event dataset to a first machine learning (ML) model comprising a plurality of weights. The first ML model may be established by: identifying training data comprising (i) a first sample event dataset associated with a second network operation and (ii) a second sample event dataset corresponding to a modification of a portion of the first sample event dataset; generating, by applying to the first ML model, (i) a first plurality of embeddings using the first sample event dataset and (ii) a second plurality of embeddings using the second sample event dataset; comparing the first plurality of embeddings with the second plurality of embeddings to generate a similarity metric; and updating at least one of the plurality of weights of the first ML model based on the similarity metric. The one or more processors may generate, based on applying the event dataset of the first network operation to the ML model, a plurality of embeddings indicative of fraudulence of the first network operation. The one or more processors may send the plurality of embeddings to a second ML model to determine a likelihood of fraudulence in the first network operation.

In one embodiment, the first ML model may established by: identifying second training data comprising a third sample event dataset comprising an obfuscation of a portion of a fourth sample event dataset associated with a third network operation; generating, by applying to the first ML model, a third plurality of embeddings using the third sample event dataset; comparing the third plurality of embeddings with the portion of the fourth sample event dataset to determine a reconstruction metric; and updating at least one of the plurality of weights of the first ML model in accordance with the reconstruction metric.

In another embodiment, the one or more processors may generate, using a tokenizer of the first ML model, a sequence of tokens using the first event dataset. The one or more processors may generate, based on providing the sequence of tokens to the first ML model in at least one of an encoder architecture or decoder architecture, the plurality of embeddings. In yet another embodiment, the one or more processors may retrieve a plurality of event datasets associated with the network operation over a time period prior to receipt of the request to execute the network operation. The one or more processors may generate, based on applying the plurality of event datasets to the first ML model, a sequence of embedding sets. Each of the embedding sets may include a respective plurality of embeddings for a corresponding event dataset of the plurality of datasets.

In yet another embodiment, the one or more processors may receive, from a computing system, the request to execute the first network operation. The one or more processors may retrieve the event dataset comprising a plurality of records identifying network activities associated with the computing system. In yet another embodiment, the one or more processors may generate the plurality of embeddings corresponding to a semantic representation of the event dataset associated with the first network operation. In yet another embodiment, the one or more processors may determine, responsive to sending the plurality of embedding to the second ML model, a classification indicating one of non-fraudulent or fraudulence of the first network operation.

The one or more processors may execute the first network operation in accordance with the classification.

Aspects of the present disclosure may be directed to systems and methods of training machine learning (ML) models to generate embeddings for network events to detect fraudulent activities in networked environments. One or more processors may identify training data comprising (i) a first sample event dataset associated with a second network operation and (ii) a second sample event dataset corresponding to a modification of a portion of the first sample event dataset. The one or more processors may generate, based on applying to a first ML model comprising a plurality of weights, (i) a first plurality of embeddings using the first sample event dataset and (ii) a second plurality of embeddings using the second sample event dataset. The one or more processors may compare the first plurality of embeddings with the second plurality of embeddings to generate a similarity metric. The one or more processors may update at least one of the plurality of weights of the first ML model based on the similarity metric. The one or more processors may store the plurality of weights of the first ML model to generate a second plurality of embeddings for a second network operation to be provided to a second ML model to determine a likelihood of fraudulence in the second network operation.

In one embodiment, the one more processors may identify second training data comprising a third sample event dataset comprising an obfuscation of a portion of a fourth sample event dataset associated with a third network operation. The one or more processors may generate, by applying to the first ML model, a third plurality of embeddings using the third sample event dataset. The one or more processors may compare the third plurality of embeddings with the portion of the fourth sample event dataset to determine a reconstruction metric. The one or more processors may update at least one of the plurality of weights of the first ML model in accordance with the reconstruction metric.

In another embodiment, the one or more processors may determine the reconstruction metric in accordance with a linear probe. In yet another embodiment, the one or more processors may generate, based on applying the first ML model to a plurality of event datasets associated with network operations, a plurality of clusters including (i) a first cluster corresponding to first embedding sets labeled as fraudulent and (ii) a second cluster corresponding to second embedding sets labeled as non-fraudulent. The one or more processors may train the second ML model to determine likelihoods of frauds in the network operations, using the plurality of clusters.

In yet another embodiment, the one or more processors may determine the similarity metric in accordance with at least one of an entropy function, a covariance function, or a linear probe. In yet another embodiment, the one or more processors may update at least one of the plurality of weights of a tokenizer in the first ML model to generate embeddings indicative of fraudulence in network operations.

Aspects of the present disclosure may be directed to systems and methods of detecting fraudulent activities in networked environments using embeddings generated from network events. One or more processors may receive, from a first machine learning (ML) model, a plurality of embeddings generated using an event dataset associated with a network operation, the plurality of embeddings indicative of fraudulence of the network operation. The one or more processors may apply the plurality of embeddings to a second ML model comprising a plurality of weights. The second ML model may be established by: identifying training data comprising (i) a sample plurality of embeddings generated using a sample event dataset associated with a sample network operation and (ii) a label indicating one of fraudulence or non-fraudulence of the sample network operation, applying the second plurality of embeddings to the second ML model to determine a sample score indicating a likelihood of fraudulence in the sample network operation, comparing the sample score with label for the sample network operation to generate a loss metric, and updating at least one of the plurality of weights in accordance with the sample score. The one or more processors may determine, based on applying the plurality of embeddings to the second ML model, a score indicating a likelihood of fraudulence in the network operation. The one or more processors may execute an action on the network operation in accordance with the score.

In one embodiment, the one or more processors may determine that the score indicating the likelihood of fraudulence does not satisfy a threshold. The one or more processors may execute the action to permit the network operation, responsive to determining that the score does not satisfy the threshold. In another embodiment, the one or more processors may determine that the score indicating the likelihood of fraudulence satisfies a threshold. The one or more processors may execute, responsive to determining that the score satisfies the threshold, the action comprising at least one of (i) restriction of the network operation or (ii) providing an alert associated with the network operation.

In yet another embodiment, the one or more processors may receive, from a computing system, a request to execute the network operation in a network environment. The one or more processors may identify a plurality of event datasets associated with at least one of the network operation or the computing system over a time period, prior to receipt of the request to execute the network operation. The one or more processors may provide the plurality of datasets to the first ML model to generate a plurality of embedding sets corresponding to the time period.

In yet another embodiment, the one or more processors may determine, based on applying a plurality of embedding sets associated with a computing system corresponding to a time period to the second ML model, a plurality of scores corresponding to the time period, each of the plurality of scores indicating a respective likelihood of fraudulence for the computing system. In yet another embodiment, the one or more processors may generate a classification indicating one of fraudulence or non-fraudulence for the computing system based on the plurality of scores corresponding to the time period. The one or more processors may execute the action on the network operation in accordance with the classification.

In yet another embodiment, the one or more processors may detect, for the computing system, an anomalous event corresponding to at least one of the plurality scores exceeding a threshold over the time period. The one or more processors may execute the action on the network operation, responsive to detecting the anomalous event. In yet another embodiment, the one or more processors may store, on a data structure for a computing system associated with the network operation, the score to a plurality of scores over a time period relative to receipt of the network operation. The one or more processors may select, from a plurality of actions, the action on the network operation using the plurality of scores for the computing system.

In yet another embodiment, the one or more processors may identify the training data comprising a plurality of sample clusters including (i) a first sample cluster corresponding to first embedding sets labeled as fraudulent and (ii) a second sample cluster corresponding to second embedding sets labeled as non-fraudulent, each of the first embedding sets and the second embedding sets generated based on applying the first ML model to a plurality of event datasets associated with network operations. In yet another embodiment, the first ML model may be established using training data generated from a plurality of event datasets corresponding to a plurality of network operations in accordance with at least one of contrastive learning or mask learning.

It is to be understood that both the foregoing general description and the following detailed description are explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
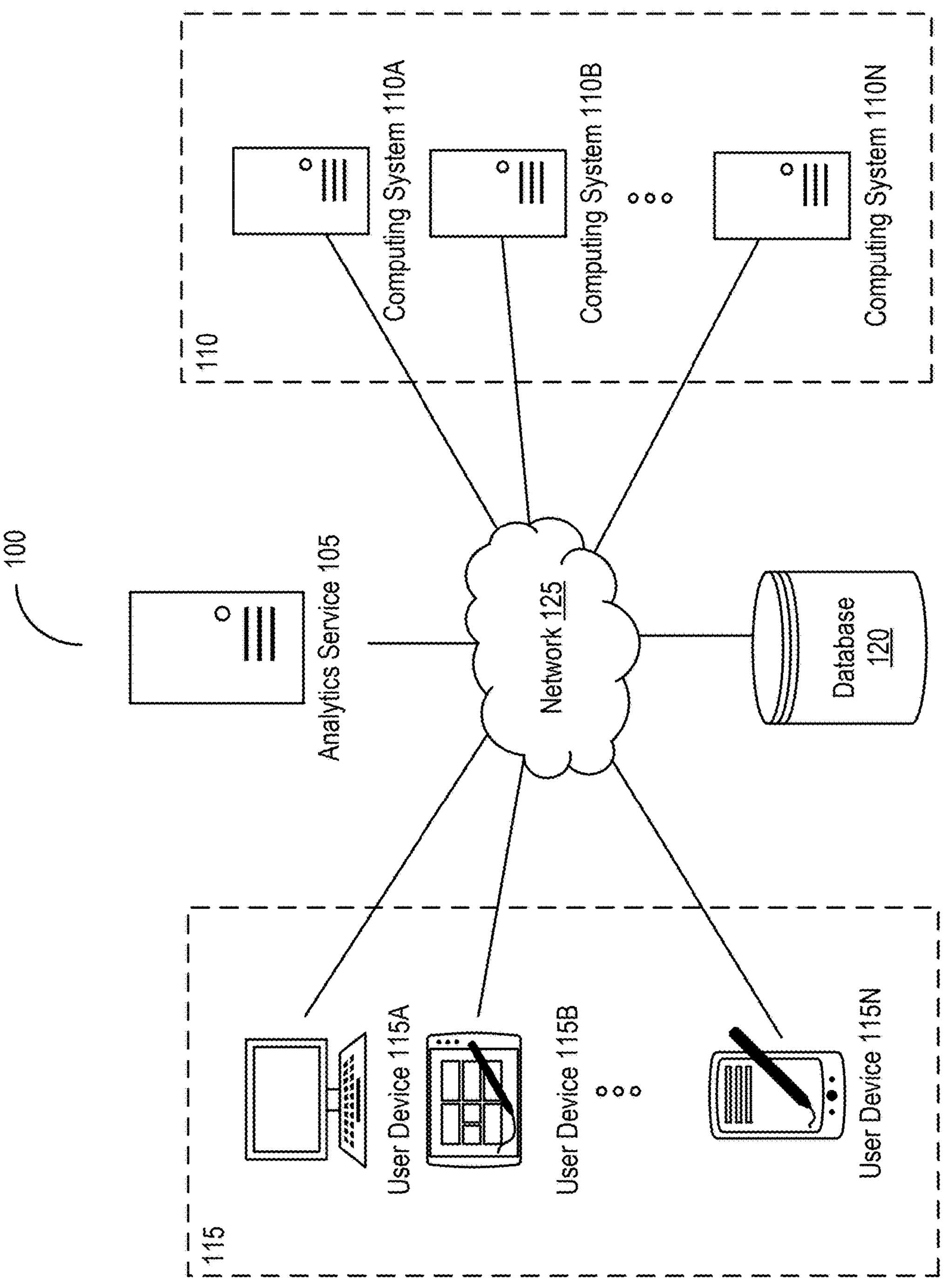
FIG. 1 depicts a block diagram of a system for generating embeddings of network event data to detect fraudulent activities in networked environments, in accordance with an embodiment.

Reference will now be made to the illustrative embodiments illustrated in the drawings, and specific language will be used here to describe the same. Nevertheless, it will be understood that no limitation of the scope of the claims or this disclosure is intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described here in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Presented herein are systems and methods for generating embeddings of network event data to detect fraudulent activities in networked environments. When a request for network operation is received from a computing system, a server may identify context data associated with the request or the computing system. The server may apply the data to an embedding model that has been trained using mask learning and contrastive learning to generate embeddings indicative of fraudulence. The server may apply the embeddings generated by the embedding model to an evaluation model to determine a likelihood of fraudulent behavior on the part of the computing system. Based on the likelihood, the computing system may determine whether to permit or restrict the network operation of the request. In this manner, the server may detect fraudulent behavior deviating from the normal behavior for a given computing system over time, even if the individual requests themselves are determined to be valid or authenticated.

FIG. 1 depicts a block diagram of a system 100 for generating embeddings of network event data to detect fraudulent activities in networked environments. In brief overview, the system 100 may include at least one analytics service 105, a set of computing systems 110A-N (hereinafter generally referred to as computing systems 110), a set of user devices 115A-N (hereinafter generally referred to as user devices 115), and at least one database 120, among others, communicatively coupled with one another via at least one network 125. Each of the components described in FIG. 1 may be implemented or performed using any one or more of the hardware or combination of software and hardware components detailed herein.

The analytics service 105 (sometimes herein referred to as a server or service) may be any computing device comprising of a processor and non-transitory, machine-readable storage capable of executing the various tasks and processes described herein. The analytics service 105 may be associated with an entity (e.g., a system administrator) detecting fraudulent behavior by a given computing system 110 in communicating with user devices 115. In some embodiments, the analytics service 105 may be associated with a payments processor entity, handling transaction requests received from entities associated with the computing system 110. In some embodiments, the analytics service 105 may be integrated with other services to facilitate detection of fraudulent behavior. For example, the analytics service 105 may be part of a risk management system to detect fraudulent behavior on part of entities (e.g., associated with computing systems 110).

The analytics service 105 may utilize features described herein to retrieve data and generate/display results, such as via a platform displayed on various devices. The analytics service 105 may generate and display a dashboard interface platform (e.g., an information generation platform that is sometimes referred to as a platform) on any device discussed herein. For instance, the platform may include one or more graphical user interfaces (GUIs) displayed on an administrator device. An example of the platform generated and hosted by the analytics service 105 may be a web-based application or a website configured to be displayed on various electronic devices, such as mobile devices, tablets, personal computers, and the like. The platform may include various input elements configured to receive information requests from any of the users and display results in response to such information requests during the execution of the methods discussed herein. The analytics service 105 may iteratively execute the applications to process and generate responses to the information requests.

The analytics service 105 may employ various processors, such as a central processing unit (CPU) and graphics processing unit (GPU), among others. Non-limiting examples of such computing devices may include workstation computers, laptop computers, server computers, and the like. While the system 100 includes a single analytics service 105, the analytics service 105 may include any number of computing devices operating in a distributed computing environment, such as a cloud environment. The analytics service 105 may be in communication with the computing systems 110, the user devices 115, and the database 120, via the network 125. While the system 100 includes a single analytics service 105, the analytics service 105 may include any number of computing devices operating in a distributed computing environment, such as a cloud environment.

The computing system 110 may be any computing device comprising of a processor and a non-transitory, machine-readable storage medium capable of performing the various tasks and processes described herein. The computing system 110 may be associated with an entity communicating requests for network operations to the analytics service 105 on behalf of the user devices 115. For instance, the computing system 110 may be a merchant platform system submitting transaction requests for processing to the analytics service 105. To interface or communicate with the analytics service 105, the computing system 110 may register itself with the analytics service 105. The registration information may include, for example, an account identifier, contact information, or a website address, among others. The entity associated with the merchant platform system may have an account set up with the payments processor entity associated or interfacing with the analytics service 105. The computing system 110 may facilitate, host, or otherwise maintain resources accessible by the user devices 115. The resources may be accessible via a web application provided to the user device 115.

The computing system 110 may be in communication with the analytics service 105, the user devices 115, and the database 120, via the network 125. The computing system 110 may be situated, located, or otherwise associated with at least one server group. Each server group may correspond to a data center, a branch office, or a site at which a subset of servers is situated or associated. In some embodiments, the computing system 110 may be a cloud storage service provider corresponding to a distributed group of servers on a cloud network. In some embodiments, the computing system 110 may be a workstation computer, laptop computer, phone, tablet computer, or server computer, among others.

The user device 115 may be any computing device comprising of a processor and a non-transitory, machine-readable storage medium capable of performing the various tasks and processes described herein. Non-limiting examples of the user device 115 may be a workstation computer, laptop computer, phone, tablet computer, or server computer. During operation, various users may use one or more of the user device 115 to access the functions and resources hosted by the analytics service 105 via one of the computing systems 110, among others. For example, the user may make a transaction request on a webpage or web component associated with the computing system 110 and presented on the display of the user device 115. The user device 115 may send the information for the request to the computing system 110, and the computing system 110 may in generate the request for network operations to the analytics service 105. Even though referred herein as "user" devices, these devices may not always be operated by users.

The database 120 may store and maintain data for various operations in the system 100. The database 120 may be in communication with the analytics service 105, the computing system 110, and the user devices 115, among others, via the network 125. In some embodiments, the database 120 may include a database management system (DBMS) to arrange and organize the data maintained across the databases. In some embodiments, the database 120 may be a part of the analytics service 105. In some embodiments, the database 120 may be separate from the analytics service 105 (e.g., as depicted).

The above-mentioned components may be connected to each other through a network 125. The examples of the network 125 may include, but are not limited to, private or public LAN, WLAN, MAN, WAN, and the Internet. The network 125 may include both wired and wireless communications according to one or more standards and/or via one or more transport mediums. The communication over the network 125 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network. The architecture and components described herein may be used to implement the following systems and methods.

Figure 2:
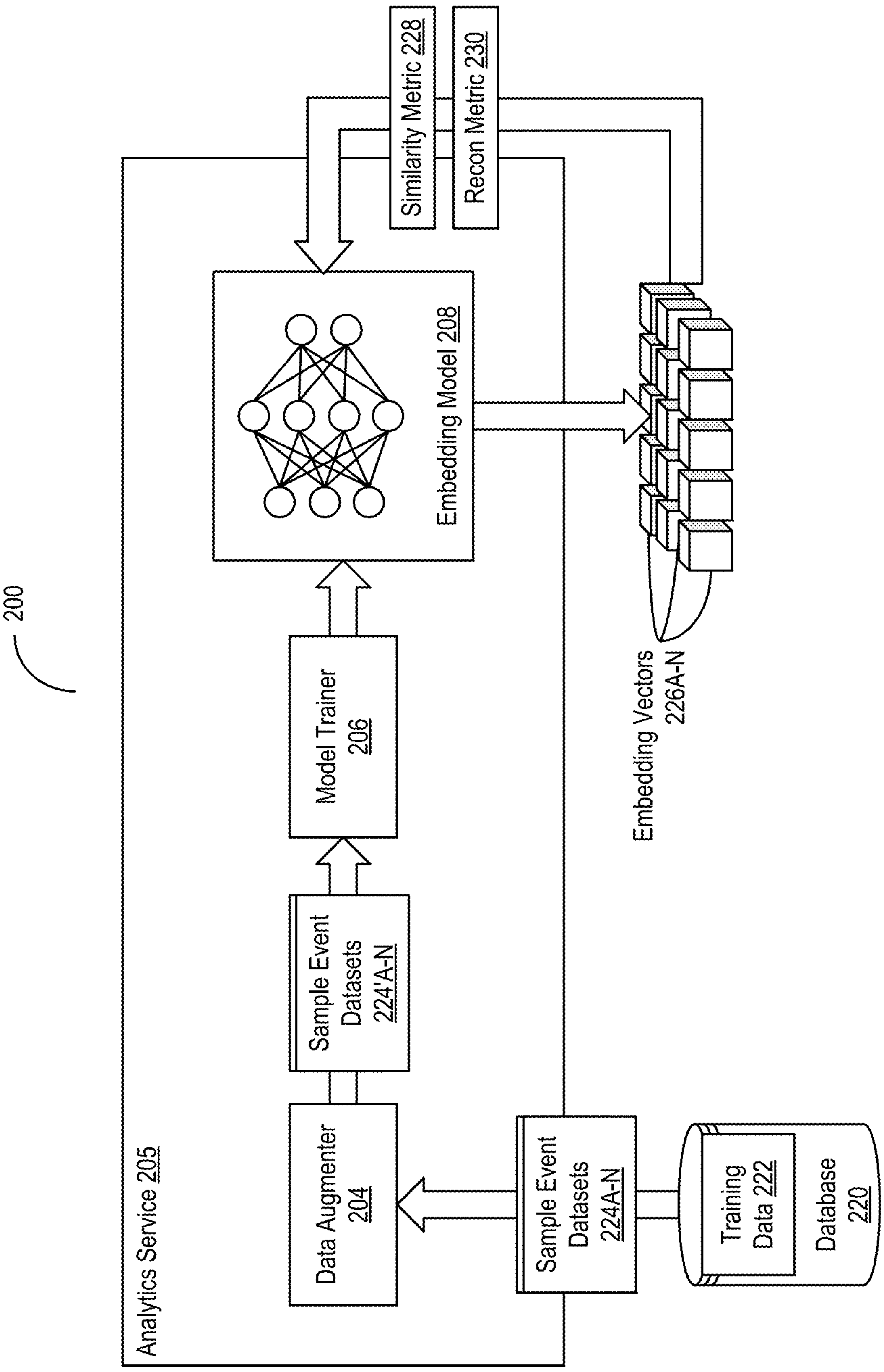
FIG. 2 depicts a block diagram of a system for training embedding models to generate embeddings from event datasets associated with network operations, in accordance with an embodiment.

FIG. 2 depicts a block diagram of a system 200 for training embedding models to generate embeddings from event datasets associated with network operations. The system 200 may include at least one analytics service 205 and at least one database 220, among others. The analytics service 205 may include at least one data augmenter 204, at least one model trainer 206, and at least one embedding model 208. The database 220 may store and maintain training data 222. Embodiments may comprise additional or alternative components or omit certain components from those of FIG. 2 and still fall within the scope of this disclosure. Various hardware and software components of one or more public or private networks may interconnect the various components of the system 200. Each component in system 200 may be any computing device comprising one or more processors coupled with memory and software and capable of performing the various processes and tasks described herein.

The embedding model 208 (sometimes herein referred to as a first machine learning (ML) model) is or includes a machine learning model to generate embeddings from input data. The embedding model 208 may be a transformer-based model, such as a generative pre-trained transformer (GPT) model or bidirectional encoder representations from transformers (BERT), among others. The embedding model 208 can include a set of weights arranged across a set of layers in accordance with the transformer architecture. Under the architecture, the embedding model 208 may include at least one tokenization layer (sometimes referred to herein as a tokenizer), at least one input embedding layer, at least one position encoder, at least one encoder stack, at least one decoder stack, and at least one output layer, among others, interconnected with one another (e.g., via forward, backward, or skip connections). In some embodiments, the transformer layer may lack the encoder stack (e.g., for a decoder-only architecture) or the decoder stack (e.g., for an encoder-only model architecture).

In the embedding model 208, the tokenization layer may convert raw input in the form of a set of strings into a corresponding set of tokens (also referred to herein as word vectors or vectors) in an n-dimensional feature space. The input embedding layer may generate a set of embeddings using the set of tokens. Each embedding may be a lower dimensional representation of a corresponding token and may capture the semantic and syntactic information of the string associated with the token. The position encoder may generate positional encodings for each input embedding as a function of a position of the corresponding token or by extension the string within the input set of strings.

The encoder stack of the embedding model 208 may include a set of encoders. Each encoder may include at least one attention layer and at least one feed-forward layer, among others. The attention layer (e.g., a multi-head self-attention layer) may calculate an attention score for each input embedding to indicate a degree of attention the embedding is to place focus on and generate a weighted sum of the set of input embeddings. The feed-forward layer may apply a linear transformation with a non-linear activation (e.g., a rectified linear unit (ReLU)) to the output of the attention layer. The output may be fed into another encoder in the encoder stack in the transformer layer. When the encoder is the terminal encoder in the encoder stack, the output may be fed to the decoder stack.

The decoder stack of the embedding model 208 may include at least one attention layer, at least one encoder-decoder attention layer, and at least one feed-forward layer, among others. In the decoder stack, the attention layer (e.g., a multi-head self-attention layer) may calculate an attention score for each output embedding (e.g., embeddings generated from a target or expected output). The encoder-decoder attention layer may combine inputs from the attention layer in the decoder stack and the output from one of the encoders in the encoder stack and may calculate an attention score from the combined input. The feed-forward layer may apply a linear transformation with a non-linear activation (e.g., a rectified linear unit (ReLU)) to the output of the encoder-decoder attention layer. The output of the decoder may be fed to another decoder in the decoder stack. When the decoder is the terminal decoder in the decoder stack, the output may be fed to the output layer.

The output layer of the embedding model 208 may include at least one linear layer and at least one activation layer, among others. The linear layer may be a fully connected layer to perform a linear transformation on the output from the decoder stack to calculate token scores. The activation layer may apply an activation function (e.g., a softmax, sigmoid, or rectified linear unit) to the output of the linear function to convert the token scores into probabilities (or distributions). The probability may represent a likelihood of occurrence for an output token, given an input token. The output layer may use the probabilities to select an output token (e.g., at least a portion of output text, image, audio, video, or multimedia content with the highest probability). Repeating this over the set of input tokens, the resultant set of output tokens may be used to form the output embeddings of the overall embedding model 208.

The training data 222 is used to train the embedding model 208. The training data 222 may be unlabeled to facilitate unsupervised learning for the embedding model 208. The training data 222 may identify or include one or more sample event datasets 224A-N (hereinafter generally referred to as sample event datasets 224). Each sample event dataset 224 (sometimes herein referred to as context data) may be associated with a network operation, a request for the network operation, a computing system from which the request originates, or a user device in communication with the computing system, among others. As used herein, a network operation may represent a transaction. Specifically, a network operation may represent a sequence of processes to be performed by the server (e.g., the analytics service 205) using the attributes provided in the request (e.g., transaction attributes) to facilitate the transaction. The server may perform the sequence of processes for the transaction in accordance with the requested network operation and may return a response to the computing system based on the performance of the network operation. For instance, if the network operation has succeeded, the transaction is approved and facilitated by the server. The sample event datasets 224 may be generated from previous requests for network operation with the server.

The sample event dataset 224 may include or identify various information associated with a network operation, a request for the network operation, or the computing system, among others. The information may be in the form of text strings (e.g., alphanumeric characters) in unstructured or structured format. In some embodiments, the sample event dataset 224 may include a set of field-values pairs for the network operation, the request, or the computing system. The sample event datasets 224 of the training data 222 may be stored and maintained in various formats, such as an extensible markup language (XML), comma-separated values (CSV), JavaScript Object Notation (JSON), or a database file (SQL)), among others, on the database 220. For example, the sample event dataset 224 may be a record of a transactions in XML, with a set of key-value pairs for transaction identifier, timestamp, amount, payment method, current type, status, customer identifier, merchant identifier, item identifier, quantity, geographic location, channel, phone number, email address, mail address (e.g., city, state, and country), network address, device identifier, or device type, among others. In some embodiments, a set of sample event datasets 224 may be associated with a corresponding set of requests from a given computing system over a set time period (e.g., ranging between 5 minutes to 1 month). The sample event datasets 224 may be sampled at an interval within the set time period. The interval may range between 10 seconds to 1 week.

The data augmenter 204 executing on the analytics service 205 retrieves, obtains, or otherwise identifies the training data 222 including the one or more sample event datasets 224 from the database 220. With the identification of the sample event dataset 224, the data augmenter 204 may create, produce, or otherwise generate one or more modified sample event datasets 224'A-N (hereinafter generally referred to as modified sample event datasets 224'). The modification of at least a portion of the sample event dataset 224 may facilitate the training of the embedding model 208. In some embodiments, for contrastive learning, the data augmenter 204 may generate at least one modified sample event datasets 224' by altering, perturbing, or modifying at least a portion of the corresponding original sample event dataset 224. The portion to be perturbed may correspond to a subset (e.g., one or more alphanumeric characters) of at least one value in a corresponding field of the sample event dataset 224. For instance, the data augmenter 204 may delete or substitute one or more alphanumeric characters in the values for certain fields (e.g., at least one number in postal code or inversion of area code in phone number) of the sample event dataset 224 to create the modified sample event dataset 224'.

In some embodiments, for mask learning, the data augmenter 204 may generate at least one modified sample event datasets 224' by hiding or obfuscating at least a portion of the corresponding original sample event dataset 224. The obfuscated portion may correspond to at least one value (e.g., in its entirety) in a corresponding field in the sample event dataset 224. The field and by extension value to be obfuscated may be selected at random by the data augmenter 204. For example, the data augmenter 204 may remove or replace one or more values for certain fields (e.g., entity identifier for sender) with placeholders in the sample event dataset 224 to create the modified sample event dataset 224'. With the generation, the data augmenter 204 may add, insert, or otherwise include the modified sample event dataset 224' into the training data 222.

The model trainer 206 executing on the analytics service 205 initializes, trains, and establishes the embedding model 208 using the training data 222. The model trainer 206 may perform unsupervised learning, such as contrastive learning or mask learning (or both in any order), on the embedding model 208 using the training data 222. The contrastive learning may encode the weights of the embedding model 208 to generate similar embeddings for input data that are relatively similar and generate dissimilar embeddings for input data that are relatively dissimilar. The mask learning may train the weights of embedding model 208 to learn to generate robust and generalizable representations of data. To train, the model trainer 206 may input, provide, or otherwise apply each sample event dataset 224 or 224' to the embedding model 208. In some embodiments, for contrastive learning, the model trainer 206 may apply at least one sample event dataset 224 and a corresponding modified sample event dataset 224' for each sample event dataset 224 to the embedding model 208 separately. In some embodiments, for mask learning, the model trainer 206 may apply at least one modified sample event dataset 224' for each sample event dataset 224 to the embedding model 208. In applying, the model trainer 206 may process the input sample event dataset 224 or 224' in accordance with the architecture of the embedding model 208 as detailed herein.

In some embodiments, using an encoder-only architecture for the embedding model 208, the tokenization layer of the embedding model 208 may generate sequence of tokens in an n-dimensional feature space using the strings in the input (e.g., the sample event dataset 224 or 224'). The input embedding layer may generate a set of embeddings using the sequence of tokens. The position encoder may generate positional encodings for each input embedding as a function of a position of the corresponding tokens or by extension the string within the input (e.g., the sample event dataset 224 or 224'). In the encoder stack of the embedding model 208, the attention layer may calculate an attention score for each input embedding to indicate a degree of attention the embedding is to place focus on and generate a weighted sum of the set of input embeddings. The feed-forward layer may apply a linear transformation with a non-linear activation (e.g., a rectified linear unit (ReLU)) to the output embeddings of the attention layer. The output embeddings may be fed into another encoder in the encoder stack. When the encoder is the terminal encoder in the encoder stack, the output embeddings may be used as the output for the overall embedding model 208.

In some embodiments, using a decoder-only architecture for the embedding model 208, the tokenization layer of the embedding model 208 may produce, create, or otherwise generate a sequence of tokens in an n-dimensional feature space using the strings in the input (e.g., the sample event dataset 224 or 224'). The input embedding layer may generate a set of embeddings using the sequence of tokens. The position encoder may generate positional encodings for each input embedding as a function of a position of the corresponding tokens or by extension the string within the input (e.g., the sample event dataset 224 or 224'). In the decoder stack of the embedding model 208, the attention layer (e.g., a multi-head self-attention layer) may calculate an attention score for each output embedding (e.g., embeddings generated from a target or expected output). The feed-forward layer may apply a linear transformation with a non-linear activation (e.g., a rectified linear unit (ReLU)) to the output embeddings of the attention layer. The output embeddings of the decoder may be fed to another decoder in the decoder stack. When the decoder is the terminal decoder in the decoder stack, the output embeddings may be used as the output for the overall embedding model 208. Although described herein primarily using encoder-only and decoder-only architecture, other architectures (e.g., encoder and decoder) may be used for the embedding model 208.

Based on applying the sample event dataset 224 or 224' to the embedding model 208, the model trainer 206 may create, produce, or otherwise generate at least one corresponding embedding vector 226A-N (hereinafter generally referred to as an embedding vector 226). Each embedding vector 226 (also referred herein as a set of embeddings or an embedding set) may be indicative of fraudulence (e.g., fraudulent behavior) in the network operation, the request, or on the part of the computing system associated with the sample event dataset 224. The embedding vector 226 may be a representation of the semantic meaning in a n-dimensional feature space. In some embodiments, for contrastive learning, the model trainer 206 may generate at least one embedding vector 226 corresponding to the sample event dataset 224. The model trainer 206 may generate at least one embedding vector 226 corresponding to the modified sample event dataset 224' with the perturbed portion. In some embodiments, for mask learning, the model trainer 206 may generate at least one embedding vector 226 corresponding to the modified sample event dataset 224' with the obfuscated portion.

The model trainer 206 may compare the embedding vectors 226 to determine one or more loss metrics for updating the embedding model 208. In some embodiments, for contrastive learning, the model trainer 206 may compare the embedding vector 226 generated using the original sample event dataset 224 with the embedding vector 226 generated using the corresponding modified sample event dataset 224' with the perturbed portion. Based on the comparison, the model trainer 206 may calculate, generate, or otherwise determine at least one similarity metric 228. The similarity metric 228 may identify or indicate a degree of similarity between the embedding vector 226 generated using the original sample event dataset 224 with the embedding vector 226 generated using the corresponding modified sample event dataset 224'. The similarity metric 228 may be generated in accordance with an entropy function (e.g., Shannon entropy, cross-entropy, or relative entropy), a covariance function (e.g., a matrix norm, Frobenius norm, or cross-variance) or a linear probe (e.g., a linear or logistic regression), among others.

In some embodiments, for mask learning, the model trainer 206 may compare at least a portion of the embedding vectors 226 with the obfuscated portion of the original sample event dataset 224. The comparison may be between the embedding vector 226 with an embedding representation of the obfuscated portion or between the text representation of the embedding vector 226 with the obfuscated portion. Based on the comparison, the model trainer 206 may calculate, generate, or otherwise determine at least one reconstruction metric 230. The reconstruction metric 230 may indicate a degree of deviation (or accuracy) of the embedding vectors 226 with respect to the obfuscated portion from the original sample event dataset 224. In some embodiments, the model trainer 206 may determine the reconstruction metric 230 in accordance with a linear probe (e.g., a linear or logistic regression), an entropy function (e.g., cross-entropy loss), a mean squared error (MSE) loss, or a Huber loss, among others.

The model trainer 206 may modify, change, or otherwise update one or more weights of the embedding model 208 using the one or more loss metrics (e.g., the similarity metric 228 and reconstruction metric 230). In some embodiments, the model trainer 206 may update the one or more weights of at least one layer (e.g., the tokenization layer, the input embedding layer, the position encoder, the encoder stack, the decoder stack, and the output layer) of the embedding model 208 using the similarity metric 228 or reconstruction metric 230. The updating of the weights may be in accordance with a back propagation and optimization function (sometimes referred to herein as an objective function) with one or more parameters (e.g., learning rate, momentum, weight decay, and number of iterations). The optimization function may define one or more parameters at which the weights of the embedding model 208 are to be updated. The optimization function may be in accordance with stochastic gradient descent, and may include, for example, an adaptive moment estimation (Adam), implicit update (ISGD), and adaptive gradient algorithm (AdaGrad), among others. The model trainer 206 can iteratively train the embedding model 208 until convergence.

With the establishment of the embedding model 208, the model trainer 206 may store and maintain the set of weights of the embedding model 208 (e.g., on the database 220). The set of weights of the embedding model 208 may be used to generate subsequent embeddings for network operations to evaluate for fraudulence (or malicious or anomalous). The embeddings may reflect sequential, semantic information carried in the event datasets that can be used to be evaluated for fraudulent behavior on the part of the originating computing system. The embedding model 208 may be used in conjunction with another model (e.g., an evaluation model) to determine likelihood of fraudulence based on embeddings generated by the embedding model 208. With the completion of the training of the embedding model 208, the embedding model 208 may be used at interference stage to process new event datasets in response to incoming requests to execute network operations from computing systems in communication with the analytics service 205.

Figure 3:
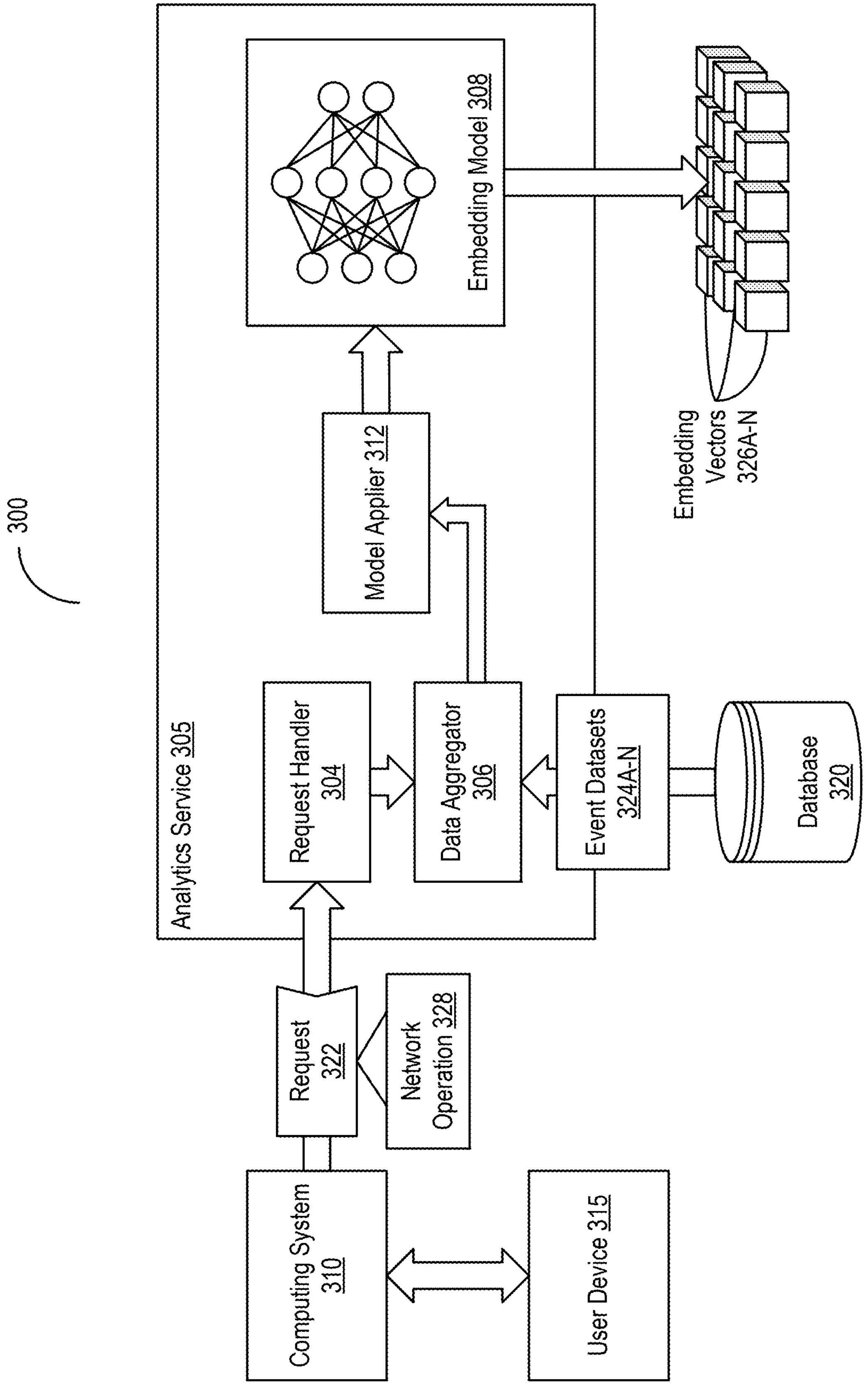
FIG. 3 depicts a block diagram a system for generating embeddings indicative of fraudulence from event datasets associated with network operations, in accordance with an embodiment.

FIG. 3 depicts a block diagram a system 300 for generating embeddings indicative of fraudulence from event datasets associated with network operations. The system 300 may include at least one analytics service 305, at least one computing system 310, at least one user device 315, and at least one database 320, among others. The analytics service 305 may include at least one request handler 304, at least one data aggregator 306, at least one model applier 312, and at least one embedding model 308, among others. The embedding model 308 may have been initialized, trained, and established as detailed herein. Embodiments may comprise additional or alternative components or omit certain components from those of FIG. 3 and still fall within the scope of this disclosure. Various hardware and software components of one or more public or private networks may interconnect the various components of the system 300. Each component in system 300 may be any computing device comprising one or more processors coupled with memory and software and capable of performing the various processes and tasks described herein.

The user device 315 sends, transmits, or otherwise provides data to the computing system 210. The data (e.g., attributes or parameters) may specify, define, or otherwise identify values for at least one network operation 328 to be performed on the analytics service 205. As used herein, a network operation 328 may represent a transaction. Specifically, a network operation may represent a sequence of processes to be performed by the server using the attributes provided in the request (e.g., transaction attributes) to facilitate the transaction. The server may perform the sequence of processes for the transaction in accordance with the requested network operation and may return a response to the computing system based on the performance of the network operation. For instance, if the network operation has succeeded, the transaction is approved and facilitated by the server.

The network operation 328 may be initiated by the user device 315 and performed through the computing system 310. The network operation 328 may correspond to a sequence of processes to be performed by the analytics service 305 (or in conjunction with the computing system 310 and the user device 315) using the data. For example, the data may include values entered in by a user of the user device 315 on a graphical user interface of a website provided by the computing system 310 to initiate a transaction request (e.g., to purchase an item or service). The data may include, for example, an identifier for the user of the user device 315 (e.g., account identifier or network address such as an Internet Protocol address), a type of network operation (e.g., function or transaction type) to be performed, parameters for the type of network operation (e.g., function inputs such as item identifier or current amount), among others. Upon entry, the user device 315 may send, transmit, or otherwise provide the data to the computing system 310.

The computing system 310 provides, transmits or otherwise sends at least one request 322 (sometimes herein referred to as an electronic request) to execute the network operation 328. The request 322 may be generated using data (e.g., attributes or parameters) defining the network operation 328 from a user device. The computing system 310 may retrieve, identify, or otherwise receive the data provided by the user device 315. Upon receipt, the computing system 310 may parse or process the data defining the network operation 328. The computing system 310 may create, produce, or otherwise generate the request 322 using the data. In some embodiments, the computing system 310 may add data for the electronic request 322. For example, the additional data may include an identity (e.g., network address or account identifier) corresponding to the computing system 310, an identifier corresponding to the user device, and a timestamp for the request, among others. In some cases (e.g., where the entity associated with the computing system 310 is malicious or fraudulent), the computing system 310 may create, produce, or otherwise generate the data to include in the request 322, independent of any user device. With the generation of the request 322, the computing system 310 may provide, transmit, or otherwise send the request 322 to the analytics service 305.

The request handler 304 executing on the analytics service 305 retrieves, identifies, or otherwise receives the request 322 from the computing system 310. The request 322 may indicate execution of the network operation 328 using the data provided by the user device 315 to the computing system 310 or by the computing system 310 itself. Upon receipt, the request handler 304 may parse or process the request 322 to extract or identify the data for the network operation 328. The request handler 304 may determine or otherwise identify an identity of the computing system 310 from which the request 322 is received. Prior to executing the network operation 328 identified in the request 322, the request handler 304 may initiate processes on the analytics service 305 to check for fraudulence in the network operation 328 (e.g., as part of fraudulent behavior on part of the computing system 310). The request handler 304 may invoke the data aggregator 306 to collect additional data and the model applier 312 to process the data using the embedding model 308.

The data aggregator 306 executing on the analytics service 305 retrieves, obtains, or otherwise identifies one or more event datasets 324A-N (hereinafter generally referred to as event datasets 324) associated with the network operation 328, the request 322, the computing system 310, or the user device 315, among others. In some embodiments, the data aggregator 306 may access the database 320 to retrieve the event dataset 324. In some embodiments, the data aggregator 306 may identify the event datasets 324 responsive to receipt of the request 322. In some embodiments, the data aggregator 306 may identify the event datasets 324 independent of any request 322 from the computing system 410. For example, the data aggregator 306 may be periodically (e.g., every 10 minutes to 1 week) invoked to assess the behavior of the computing system 410 in communications with the analytics service 405.

The event dataset 324 may include one or more records identifying network activities associated with the computing system 310. The network activities may include communications between the computing system 310 and the analytics service 405 or between the computing system 310 and other entities. The event datasets 324 may be stored and maintained on the database 320, for example, using records of network activities (e.g., previous electronic requests) by the computing system 310 to execute network operations via the analytic service 305. In some embodiments, the data aggregator 306 may use the data identified from the request 322 for the network operation 328 (e.g., identifier corresponding to the computing system 310 and timestamp for the request 322) to create, produce, or otherwise generate at least a portion of the event dataset 324. In some embodiments, the data aggregator 306 may identify or retrieve a set of event datasets 324 over a time period prior to receipt of the request 322 to execute the network operation 328. The time period (also referred herein as a time window or a sliding window) may range between 5 minutes to 1 month, among others. The event datasets 324 may be generated or sampled at an interval within the set time period. The interval may range between 10 seconds to 1 week.

Each event dataset 324 may include or identify various information associated with the network operation 328, the request 322, the computing system 310, or the user device 315, among others. The information may be in the form of text strings (e.g., alphanumeric characters) in unstructured or structured format. In some embodiments, the event dataset 324 may include a set of field-values pairs. Each event dataset 324 may be stored and maintained in various formats, such as an extensible markup language (XML), comma-separated values (CSV), JavaScript Object Notation (JSON), or a database file (SQL)), among others. For example, the event dataset 324 may be a record of a transactions in XML, with a set of key-value pairs for transaction identifier, timestamp, amount, payment method, current type, status, customer identifier, merchant identifier, item identifier, quantity, geographic location, channel, phone number, email address, mail address (e.g., city, state, and country), network address, device identifier, or device type, among others.

The model applier 312 executing on the analytics service 305 may apply the event dataset 324 to the embedding model 308. In some embodiments, the model applier 312 may apply the event dataset 324 each time the request 322 is received from the computing system 310. In some embodiments, the model applier 312 may apply the set of event datasets 324 retrieved over the time period prior to the receipt of the request 322 to the embedding model 308. The application of the set of event datasets 324 to the embedding model 308 may be performed in accordance with the temporal sequence of the event datasets 324. In applying, the model applier 312 may process the input event dataset 324 in accordance with the architecture of the embedding model 308 as detailed herein. In some embodiments, the model applier 312 may provide the input event dataset 324 (or tokens derived from the input event dataset 324) to the embedding model 308 in an encoder architecture or a decoder architecture.

In some embodiments, using an encoder-only architecture for the embedding model 308, the tokenization layer of the embedding model 308 may produce, create, or otherwise generate a sequence of tokens in an n-dimensional feature space using the strings in the input (e.g., the event dataset 324). The input embedding layer may generate a set of embeddings using the sequence of tokens. The position encoder may generate positional encodings for each input embedding as a function of a position of the corresponding tokens or by extension the string within the input (e.g., the event dataset 324). In the encoder stack of the embedding model 308, the attention layer may calculate an attention score for each input embedding to indicate a degree of attention the embedding is to place focus on and generate a weighted sum of the set of input embeddings. The feed-forward layer may apply a linear transformation with a non-linear activation (e.g., a rectified linear unit (ReLU)) to the output embeddings of the attention layer. The output embeddings may be fed into another encoder in the encoder stack. When the encoder is the terminal encoder in the encoder stack, the output embeddings may be used as the output for the overall embedding model 308.

In some embodiments, using a decoder-only architecture for the embedding model 308, the tokenization layer of the embedding model 308 may produce, create, or otherwise generate a sequence of tokens in an n-dimensional feature space using the strings in the input (e.g., the event dataset 324). The input embedding layer may generate a set of embeddings using the sequence of tokens. The position encoder may generate positional encodings for each input embedding as a function of a position of the corresponding tokens or by extension the string within the input (e.g., the event dataset 324). In the decoder stack of the embedding model 308, the attention layer (e.g., a multi-head self-attention layer) may calculate an attention score for each output embedding (e.g., embeddings generated from a target or expected output). The feed-forward layer may apply a linear transformation with a non-linear activation (e.g., a rectified linear unit (ReLU)) to the output of the attention layer. The output embeddings of the decoder may be fed to another decoder in the decoder stack. When the decoder is the terminal decoder in the decoder stack, the output embeddings may be used as the output for the overall embedding model 308. Although described herein primarily using encoder-only and decoder-only architecture, other architectures (e.g., encoder and decoder) may be used for the embedding model 308.

Based on applying the event dataset 324 to the embedding model 308, the model applier 312 creates, produces, or otherwise generates at least one embedding vector 326A-N (hereinafter generally referred to as an embedding vector 326). The embedding vector 326 (also referred herein as a set of embeddings or an embedding set) may be indicative of fraudulence (e.g., fraudulent behavior) of the network operation 328, the request 322, or on the part of the computing system associated with the event dataset 324. The embedding vector 326 may include or identify a semantic representation of the event dataset 324 (e.g., in an n-dimensional feature space). In some embodiments, when multiple event datasets 324 are applied to the embedding model 308, the model applier 312 may create, produce, or otherwise generate a sequence of embeddings 326. The embedding vectors 326 may be arranged in temporal sequence corresponding to the temporal sequence of the input set of event datasets 324. The model applier 312 may provide, transmit, or otherwise send the embedding vector 326 to an evaluation model to determine a likelihood of fraudulence of the network operation 328. In some embodiments, the model applier 312 may store and maintain an association between the embedding vector 326 with the request 322, the network operation 328, the computing system 310, or the user device 315 on the database 320.

The process detailed herein may be repeated over a period of time (e.g., ranging between 5 minutes to 1 month). For example, the computing system 310 may send another request 322 to execute a subsequent network operation 328. The request handler 304 may receive the request 322 from the computing system 310. The data aggregator 306 may identify one or more event datasets 324 associated with the request 322, the network operation 328, the computing system 310, or the user device 315, among others. The model applier 312 may apply the one or more event datasets 324 to the embedding model 308 to generate one or more corresponding embedding vectors 326. The model applier 312 may store and maintain the set of embedding vectors 326 on the database 320 for subsequent use by a downstream evaluation model to evaluate the network operations over the period of time for fraudulence. The embedding vectors 326 may capture and reflect semantic information and time-dependent information as apparent the event datasets 324. The evaluation model downstream from the embedding model 208 may use the information contained in the embedding vectors 326 to determine whether the computing system 310 exhibits anomalous or fraudulent behavior. The results of the evaluation model may be used to control (e.g., permit or restrict) the execution of the network operation 328.

Figure 4:
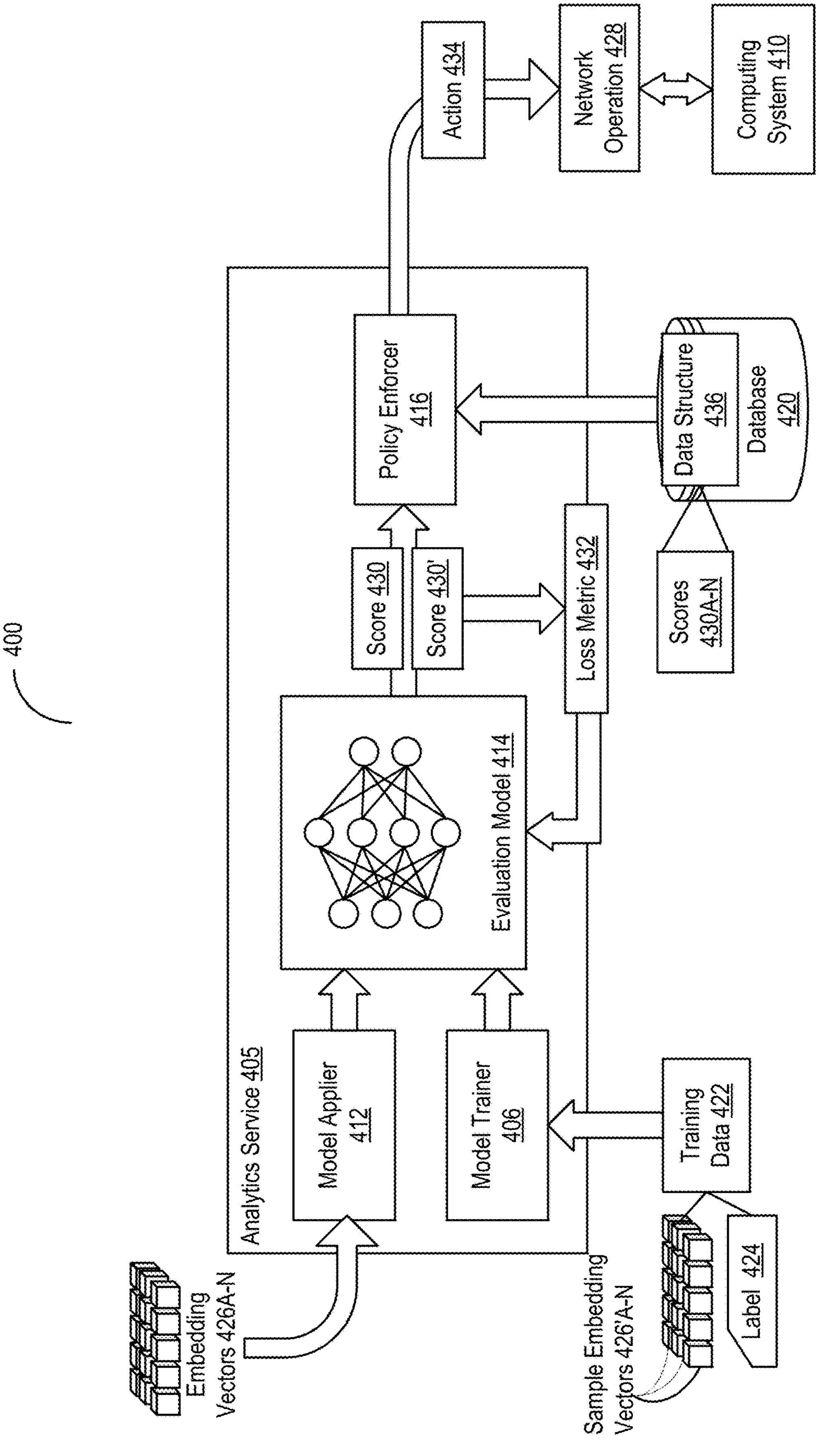
FIG. 4 depicts a block diagram of a system for training and using evaluation models to determine likelihood of fraudulence using embeddings, in accordance with an embodiment.

FIG. 4 depicts a block diagram of a system 400 for training and using evaluation models to determine likelihood of fraudulence using embeddings. The system 400 may include at least one analytics service 405, at least one computing system 410, and at least one database 420, among others. The analytics service 405 may include at least one model trainer 406, at least one model applier 412, at least one evaluation model 414, and at least one policy enforcer 416, among others. The database 420 may store and maintain training data 422 and at least one data structure 436, among others. Embodiments may comprise additional or alternative components or omit certain components from those of FIG. 4 and still fall within the scope of this disclosure. Various hardware and software components of one or more public or private networks may interconnect the various components of the system 400. Each component in system 400 may be any computing device comprising one or more processors coupled with memory and software and capable of performing the various processes and tasks described herein.

The evaluation model 414 (sometimes herein referred to as a second machine learning (ML) model) is or includes a machine learning model to determine a score indicating a likelihood of fraudulence based on embeddings generated by an embedding model. The evaluation model 414 may be a machine learning model or artificial intelligence algorithm in accordance with any architecture. The architecture may include, for example, an artificial neural network (ANN) (e.g., autoencoder, convolutional neural network (CNN), recurrent neural network (RNN), long short-term memory network (LSTM), or a transformer-based model), a large language model (LLM) (e.g., based on transformer architecture, RNN, or bidirectional encoders), a support vector machine (SVM), a clustering model (e.g., k-nearest neighbor model), a Bayesian classifier, a decision tree, a regression model (e.g., a linear or logarithmic model), or a random forest, among others. In general, the evaluation model 414 may include a set of inputs and a set of outputs, related to each other via a set of weights (sometimes herein referred to as parameters). The set of weights may be arranged in accordance with the architecture. When initialized, the set of weights may be set or assigned to defined values (e.g., random values). The embedding model may be interrelated or interfacing with the evaluation model 414. The embedding model may have been trained in accordance with contrastive learning or mask learning.

The model trainer 406 executing on the analytics service 405 retrieves, obtains, or otherwise identifies training data 422. The training data 422 is used to train the evaluation model 414 (e.g., using supervised learning). The training data 422 may include or identify a set of examples. Each example may include or identify a set of sample embeddings 426'A-N (generally referred to as sample embeddings 426') and an associated label 424 (sometimes herein referred as annotations). The sample embeddings 426 may be generated by an embedding model and may be a semantic representation of one or more sample event datasets for a given network operation. The sample event datasets may be associated with a network operation, a request for the network operation, a computing system from which the request originates, or a user device in communication with the computing system, among others. In some embodiments, the set of sample embeddings 426 may be generated using sample event datasets aggregated over a time period (e.g., ranging between 5 minutes to 1 month). The set of sample embeddings 426 may be in sequence in accordance with a temporal order of the sample event datasets. The label 424 may identify or indicate whether the network operation associated with the set of sample embeddings 426' is fraudulent or non-fraudulent. In some embodiments, the label 424 may identify or indicate whether a behavior of the computing system associated with the set of sample embeddings 426' is fraudulent or non-fraudulent.

In some embodiments, the model trainer 406 may create, produce, or otherwise generate the training data 422. For the training data 422, the model trainer 406 may create or generate a set of clusters using the sets of sample embeddings 426' generated based on applying the embedding model to the corresponding set of sample event datasets. The sample event datasets may be known or identified as fraudulent (or malicious or anomalous) or non-fraudulent (or non-malicious or normal), from previous checks of the network operations. The model trainer 406 may perform clustering of the set of sample embeddings 426' in the n-dimensional feature space in accordance with clustering algorithms (e.g., k-means clustering, hierarchical clustering, or density-based clustering). From clustering, the model trainer 406 may generate at least one cluster corresponding to a subset of the sets of sample embeddings 426' for non-fraudulent network operations and at least one other clustering corresponding to another subset of the sets of sample embeddings 426' for fraudulent network operations. With the generation of the clusters, the model trainer 406 may generate a label 424 to indicate one subset of the sets of sample embeddings as non-fraudulent. In addition, the model trainer 406 may generate a label 424 to indicate another subset of the sets of sample embeddings as fraudulent. The model trainer 406 may use the generated training data 422 to train the evaluation model 414.

With the identification, the model trainer 406 may input, provide, or otherwise apply the set of sample embeddings 426' in each example of the training data 422 to the evaluation model 414. When there are multiple sets of sample embeddings 426' over the time period, the model trainer 406 may apply the sets of sample embeddings 426' in temporal sequence into the evaluation model 414. In applying, the model trainer 406 may process the input the set of sample embeddings 426' in accordance with the set of weights of the evaluation model 414. From processing, the model trainer 406 may calculate, determine, or otherwise generate at least one sample score 430' indicating a likelihood of fraudulence (or conversely, non-fraudulence) in the sample network operation. The sample score 430' may be a numerical value ranging from 0 to 1, −1 to 1, 0 to 100, or −100 to 100, among others, to indicate the likelihood of fraudulence. In some embodiments, the score 430' may indicate a likelihood of fraudulent behavior by the computing system associated with the sample event datasets used to generate the set of embeddings.

The model trainer 406 may compare the sample score 430' with the corresponding label 424 to generate, calculate, or otherwise determine at least one loss metric 432 in accordance with a loss function. The loss function may include, for example, a norm loss (e.g., L1 or L2), mean absolute error (MAE), mean squared error (MSE), a quadratic loss, a cross-entropy loss, and a Huber loss, among others. In general, the more deviated the output score 430' is from the label, the higher the loss metric 432 may be. Conversely, the less deviated the more deviated the output likelihood of fraud is from the label, the lower the loss metric 432 may be. In some embodiments, the model trainer 406 may compare a classification derived from the score 430' with the label 424 to generate the loss metric 432. The model trainer 406 may determine the classification based on a comparison of the score 430' with a threshold. When the score 430' is greater than or equal to a threshold, the model trainer 406 may determine the classification to indicate fraudulence in the network operation or the behavior of the computing system. When the score 430' is less than the threshold, the model trainer 406 may determine the classification to indicate non-fraudulence in the network operation or the behavior of the computing system.

The model trainer 406 may modify, adjust, or otherwise update one or more of the set of weights of the evaluation model 414 using the loss metric 432. The updating of weights of evaluation model 414 may be in accordance with an optimization function. The optimization function may define one or more rates or parameters at which the weights of the evaluation model 414 are to be updated. The optimization function may be in accordance with stochastic gradient descent, and may include, for example (e.g., when the evaluation model 414 is implemented using artificial neural networks (ANN)), an adaptive moment estimation (Adam), implicit update (ISGD), and adaptive gradient algorithm (AdaGrad), among others. The model trainer 406 may update the weights of the evaluation model 414 using more and more examples in the training data 422 until convergence. Upon completion of training, the model trainer 406 may store and maintain the set of weights for the evaluation model 414 for inference from newly acquired inputs (e.g., embedding sets generated from incoming new requests).

With the establishment of the evaluation model 414, the model applier 412 executing on the analytics service 405 retrieves, identifies, or receives one or more embedding vectors 426A-N (hereinafter generally referred to as embeddings 426). The embedding vector 426 (sometimes herein referred to as an embedding vector) may have been generated by an embedding model and may be a representation of the semantic meaning in a corresponding input event datasets in connection with a request to execute a network operation 428. In some embodiments, the model applier 412 may retrieve, identify, or otherwise receive a request to execute a network from the computing system 410. The model applier 412 may retrieve, obtain, or otherwise identify at least one event dataset associated with the request, the network operation 428, the computing system 410, or a user device, among others. In some embodiments, the model applier 412 may identify a set of event datasets over a time period prior to the receipt of the request for executing the network operation 428. The model applier 412 may send, transmit, or otherwise provide the event dataset to the embedding model to generate the embedding vector 426. In some embodiments, the model applier 412 may provide the set of event datasets to the embedding model to generate corresponding embedding vectors 426 corresponding to the time period.

The model applier 412 inputs, provides, or otherwise applies the embedding vector 426 to the evaluation model 414. When there are multiple embedding vectors 426 over the time period, the model applier 412 may apply the embedding vectors 426 in temporal sequence into the evaluation model 414. In applying, the model applier 412 may process the input the set of sample embeddings 426 in accordance with the set of weights of the evaluation model 414. From processing, the model applier 412 may calculate, determine, generate at least one score 430 indicating a likelihood of fraudulence (or conversely, non-fraudulence) in the network operation. In some embodiments, the score

430 may indicate a likelihood of fraudulent behavior by the computing system 410 associated with the event datasets used to generate the embedding vector 426. The score 430 may be a numerical value ranging from 0 to 1, −1 to 1, 0 to 100, or −100 to 100, among others, to indicate the likelihood of fraudulence. In some embodiments, based on applying the embedding vectors 426 to the evaluation model 414, the model applier 412 may generate a corresponding set of scores 430 over the time period. For each embedding vector 426, the model applier 412 may generate a corresponding score 430 using the evaluation model 414. Each score 430 may indicate a respective likelihood of fraudulence in the network operation at a sampling time (corresponding to the event dataset) within the time period.

The policy enforcer 416 executing on the analytics service 405 performs, carries out, or otherwise executes at least one action 434 on the network operation 428 in accordance with the score 430. The policy enforcer 416 may determine whether the network operation 428 or the behavior of the computing system 410 is fraudulent or non-fraudulent based on comparison of the score 430 with a threshold. The threshold may delineate, define, or otherwise identify a value for the score 430 at which the network operation or the behavior of the computing system 410 is determined to be fraudulent. In some embodiments, the policy enforcer 416 may determine or generate at least one classification for the computing system 410 (or the network operations 428) based on the one or more scores 430 in comparison with the threshold. The classification may identify or indicate one of fraudulence or non-fraudulence for the computing system 410. When multiple scores 430 are used, the policy enforcer 416 may use a combined score, using any number of functions on the scores 430, such as an unweighted average, weighted moving average, exponential moving average, and summation, among others. The policy enforcer 416 may select the action 434 to perform based on the comparison of the score 430 with a threshold. In some embodiments, the policy enforcer 416 may identify the action 434 to carry out in accordance with the classification.

In some embodiments, the policy enforcer 416 may store and maintain the score 430 to include along with a set of scores 430A-N in at least one data structure 436 on the database 420. The data structure 436 may be associated with the computing system 410. For example, the data structure 436 (sometimes herein referred to as a bin) may be used to keep track of scores 430 generated for previous network operations requested by the computing system 410 over a time period (e.g., a sliding time window). The time period may range between 5 minutes to 1 month relative to the receipt of the request to execute the network operation 428 or a current time. Each time a request is received from the computing system 410, the policy enforcer 416 may store and maintain the score 430 generated in response in the data structure 436. The data structure 436 may be any type of structure, such an array, a matrix, a linked list, a tree, a heap, a class object, or a database object, among others. The policy enforcer 416 may identify or select the action 434 to execute on the network operation 428 based on the set of scores 430 maintained in the data structure 436. The policy enforcer 416 may use a combined score of the set of scores 430 on the data structure 436.

If the score 430 does not satisfy (e.g., less than) the threshold, the policy enforcer 416 may identify or determine that the network operation 428 is not fraudulent. In some embodiments, the policy enforcer 416 may identify, detect, or determine that the behavior of the computing system 410 is not fraudulent. In some embodiments, the policy enforcer 416 may determine the classification of the computing system 410 or the network operation 428 as non-fraudulent. Based on the determination as non-fraudulent, the policy enforcer 416 may execute the action 434 to allow, grant, or otherwise permit the execution of the network operation 428. The network operation 428 as defined by the request may be to carry out the requested transaction corresponding to a sequence of operations to be performed via the analytics service 105 (or via another service accessing the analytics service 105). For instance, the request transaction may be for the merchant entity associated with the computing system 410. The requested transaction may include, for instance, a database query, a read/write command, a request for payment, a transfer request, a file request, or an information request, among others.

On the other hand, if the score 430 satisfies (e.g., greater than or equal to) the threshold, the policy enforcer 416 may identify, detect, or determine the network operation 428 is fraudulent. In some embodiments, the policy enforcer 416 may identify, detect, or determine that the behavior of the computing system 410 is fraudulent. In some embodiments, the policy enforcer 416 may determine the classification of the computing system 410 or the network operation 428 as non-fraudulent. Based on the detection of fraudulence, the policy enforcer 416 may execute the action 434 to block, limit, or otherwise restrict the execution of the network operation 428. For example, the policy enforcer 416 may identify the network operation 428 in queue on the analytics service 405 and remove the network operation 428 from the queue to prevent from further processing. In some embodiments, the policy enforcer 416 may send, transmit, or otherwise provide an alert associated with the network operation 428. For instance, the policy enforcer 416 may provide the alert to notify a system administrator of the analytics service 405 or the entity associated with the computing system 410 that the behavior of the computing system 410 is fraudulent.

In some embodiments, the policy enforcer 416 may identify or select the action 434 from a candidate set of actions to execute based on the one or more scores 430. Each action 434 may be associated with a range of values for the score 430. For example, a lower range of values (e.g., 0 to 50) for the score 430 may be indicative of low risk for the network operation 428, and the network operation 428 may be permitted to be executed. An intermediate range of values (e.g., 50 to 80) may be indicative of moderate risk for the network operation 428, and the network operation 428 may be permitted to be executed although an alert may be issued to the system administrator. A high range of values (e.g., 80 to 100) may be indicative of high risk for the network operation 428, and the network operation 428 may be blocked from execution along with addition of the identifier referencing the computing system 410 (or the associated entity such as the user of the user device) on a blacklist to restrict further communications with the analytics service 405. The policy enforcer 416 may compare the score 430 with the ranges of values to select the action 434 from the candidate set of actions. With the selection, the policy enforcer 416 may execute the action 434 on the network operation 428.

In some embodiments, the policy enforcer 416 may identify, determine, or detect an anomalous event indicative of fraudulent behavior on the part of the computing system 410 using the set of scores 430 over the time period. The policy enforcer 416 may use the data structure 436 to keep track of the set of scores 430 over the time period for the computing system 410. To detect, the policy enforcer 416 may identify or determine whether at least one of the set of scores 430 exceeds a threshold. The threshold may delineate, identify, or otherwise define a value of the score 430 at which to determine that the behavior of the computing system 410 is anomalous. The threshold may be determined based on a combination of previous scores, such as an unweighted average or a moving average. When at least one of the scores 430 exceeds the threshold, the policy enforcer 416 may detect the anomalous event indicative of fraudulence. Based on the detection of the anomalous event, the policy enforcer 416 may execute the action 434 on the network operation 428 to block, limit, or otherwise restrict the execution of the network operation 428. When none of the scores 430 exceed the threshold, the policy enforcer 416 may determine lack of an anomalous event. The policy enforcer 416 may execute the action 434 to allow, grant, or otherwise permit the execution of the network operation 428.

In this manner, using the embedding model and the evaluation model, the analytics service can detect a wider range of fraudulent behavior by evaluating event datasets over a wider range of time and in sequence. The use of masked and contrastive learning may allow for the generative model to output embeddings that capture semantic meaning of event data as well as temporal dependence information of the event data over time. These embeddings can facilitate the evaluation model in determining whether the behavior over time for a given computing system represents fraudulent behavior. This may be an improvement over techniques that evaluate requests individually and independently, as the models used in such techniques do not factors data across a wide range of time and in temporal sequence. For example, with a card testing attack, a malicious entity of a computing system may send requests to execute network operations to carry out payment transactions using a previously validated card. When evaluated individually, these types of attacks may be difficult to detect, especially because the card information in the requests may have been previously validated. However, by generating embeddings to capture semantic information and time interdependent information across a time window for the computing system, the analytics service can detect such behavior of anomalous or fraudulent and restrict the execution of the network operations.

By detecting a wider range of fraudulent behavior, the analytics service may improve network security, as more malicious and fraudulent entities are blocked from accessing protected resources. Furthermore, since these embeddings reflect semantic meaning and temporal dependence information, the embedding model along with the evaluation model may be able to detect new tactics by malicious entities. This may alleviate from having to frequently retraining models to detect such fraudulent behavior, thereby conserving computing resources (e.g., processing and memory consumption) on the part of the analytics service.

Figure 5A:
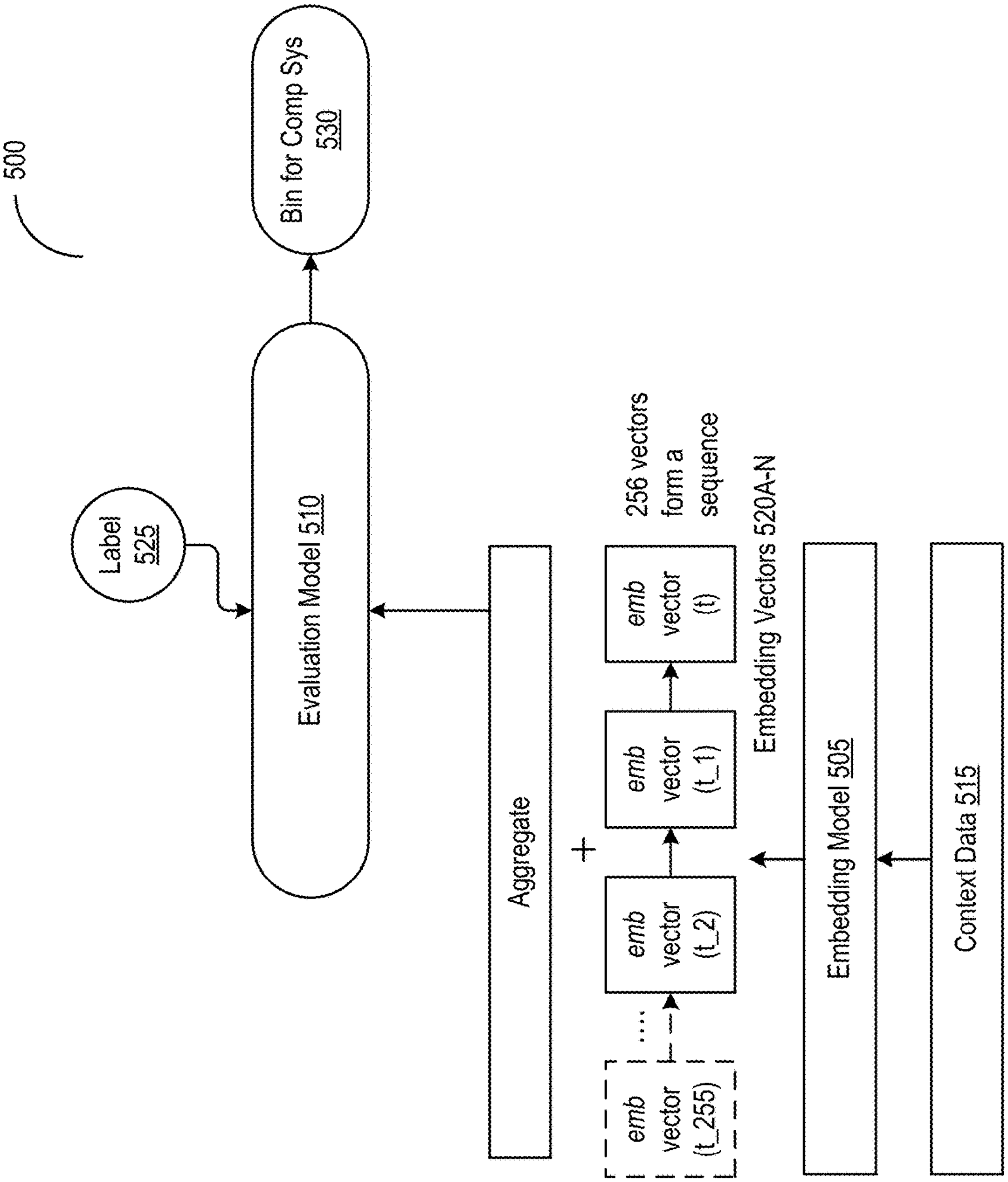
FIG. 5A depicts a block diagram of a system to determine fraudulence of computing systems using embedding vectors generated from network data over a time period, in accordance with an embodiment.

FIG. 5A depicts a block diagram of a system 500 to determine fraudulence of computing systems using embedding vectors generated from network data over a time period. The system 500 may include at least one embedding model 505 and at least one evaluation model 510. Embodiments may comprise additional or alternative components or omit certain components from those of FIG. 5A and still fall within the scope of this disclosure. Various hardware and software components of one or more public or private networks may interconnect the various components of the system 500. Each component in system 500 may be any computing device comprising one or more processors coupled with memory and software and capable of performing the various processes and tasks described herein.

As depicted, the embedding model 505 may receive context data 515 (sometimes herein referred to as event datasets). The context data 515 may be associated with a request to execute a network operation from a computing system. The context data 515 may include records of network activities (e.g., transactions) by the computing system over a period of time (e.g., from 1-255 to t as depicted). The information contained in the context data 515 may include a set of key-value pairs identifying various fields about the network activities. Upon receipt, the embedding model 505 may generate a set of embedding vectors 520A-N (hereinafter generally referred to as embedding vectors 520) based on the context data 515. The set of embedding vectors 520 may form a sequence in accordance with temporal order of the context data 515.

The evaluation model 510 may aggregate the set of embedding vectors 520 generated by the evaluation model 510 for a given network operation, request, or computing system. The evaluation model 510 may have been trained using labeled training data. The training data may have sample embeddings (e.g., similar to the embedding vectors 520) along with a label 525 indicating whether the sample network operations are fraudulent or non-fraudulent. Using each of the set of embedding vectors 520, the evaluation model 510 may determine a corresponding score indicating a likelihood of fraudulence in the behavior of the computing system. The evaluation model 510 may store each score into a bin 530 (e.g., a data structure) for the computing system. Based on the scores included in the bin 530, a server may determine whether to classify the computing system as exhibiting fraudulent or non-fraudulent behavior. When the classification is non-fraudulent behavior, the server may permit the network operation to be performed. On the other hand, when the classification is fraudulent behavior, the server may restrict the network operation from being carried out. The server may also perform countermeasures on the network operation. An example of countermeasures in response to a malicious attack is detailed below.

Figure 5B:
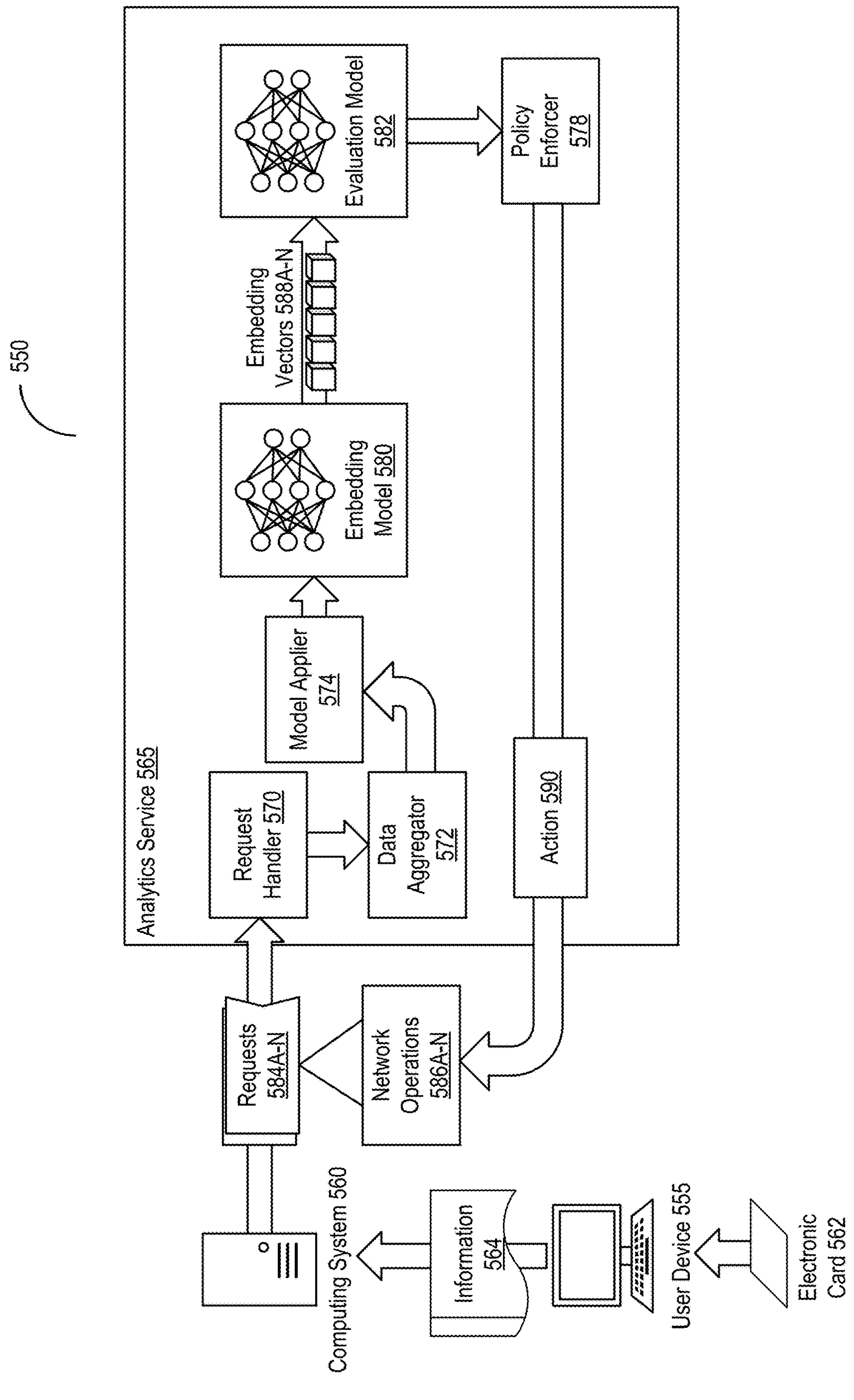
FIG. 5B depicts a block diagram of an example environment in which an analytics service is to determine fraudulence of computing systems using embedding vectors generated from network data, in accordance with an embodiment.

In a non-limiting example, FIG. 5B depicts a block diagram of an environment 550 in which an analytics service is to determine fraudulence of computing systems using embedding vectors generated from network data. The environment 550 may include at least one at least one user device 555, at least one computing system 560, and at least one analytics service 565, among others. The analytics service 565 may include at least one request handler 570, at least one data aggregator 572, at least one model applier 574, at least one policy enforcer 578, at least one embedding model 580, and at least one evaluation model 582, among others. Embodiments may comprise additional or alternative components or omit certain components from those of FIG. 5B and still fall within the scope of this disclosure. Various hardware and software components of one or more public or private networks may interconnect the various components of the system 550. Each component in system 550 may be any computing device comprising one or more processors coupled with memory and software and capable of performing the various processes and tasks described herein.

The user device 555 may be associated with a malicious entity, with unauthorized access to at least one electronic card 562. The electronic card 562 may have been previously authorized and authenticated when used by another entity (e.g., original owner) for use for transactions with the analytics service 565. The malicious entity may attempt to carry out a card test attack, in which multiple transaction requests with nominal amounts (e.g., less than 10 dollars) are sent to the analytic service 565. To that end, the user device 555 may provide information 564 from the electronic card 562 to the computing system 560. The information 564 may include various transaction attributes to facilitate the execution of the transaction associated with the electronic card 562. The information 564 may also have been previously validated for use with the analytics service 565. For instance, the email address of the original user may be maintained the same, although the electronic card 562 is now in use by a malicious entity.

With each submission of the information 564 from the user device 555, the computing system 560 may in turn generate and send at least one request 584A-N (hereinafter generally referred to as request 584) to execute a corresponding network operation 586A-N (hereinafter generally referred to as network operations 586). Individually, each request 584 may lack any information indicating of the malicious entity. For example, the information 564 and the electronic card 562 may have been previously authenticated and authorized for use with the analytics 565, and thus include an identifier of the previous user rather than the malicious entity. The computing system 560 may transmit the requests 584 over a period of time (e.g., 10 minutes to 2 weeks) to the analytics service 565 as part of the card test attack.

On the analytics service 565, the request handler 570 may receive the requests 584 from the computing system 560 over the period of time. Upon receipt of each request 584, the data aggregator 572 may retrieve or generate event dataset associated with the request 584, the network operation 586, the user device 555, or the computing system 560, among others. The event dataset (or contextual data) may identify or include information from records of network activities by the computing system 560 or the contents of the request 584. With the identification, the model applier 574 may apply the event dataset to the embedding model 580 to generate an embedding vector 588A-N (hereinafter generally referred to as embedding vector 588). The embedding model 580 may have been trained to generate embeddings capturing semantic and time or sequence-dependent information. As more and more request 584 are received and event datasets are gathered, the model applier 574 may apply the event dataset to the embedding model 580 to generate a set of embedding vectors 588. Each embedding vector 588 may be a semantic representation of the information contained in the event datasets and may also capture the time-dependent information among the different event datasets for the requests 584 from the computing system 560.

The model applier 574 may apply the embedding vectors 588 to the evaluation model 582 to determine a score indicative of a likelihood that the behavior exhibited by the computing system 560 (e.g., with respect to the transmission of the requests 584) is fraudulent. As the requests 584 are being sent as part of a card attack, the model applier 574 may determine the score to indicate high likelihood (e.g., above 90%) that the exhibited behavior is fraudulent. This may be despite the fact that each individual request 584 when evaluated independently of the others yields no indication of fraud. As a result, the policy enforcer 578 may select an action 590 to restrict the execution of the network operations 586 in the requests 584 from the computing system 560. For instance, upon detecting the fraudulent behavior, the policy enforcer 578 may identify the action 590 to block execution of the network operation 586 and add the user associated with the user device 555 to a blacklist to prevent future network operations for transactions involving the electronic card 562.

Figure 6:
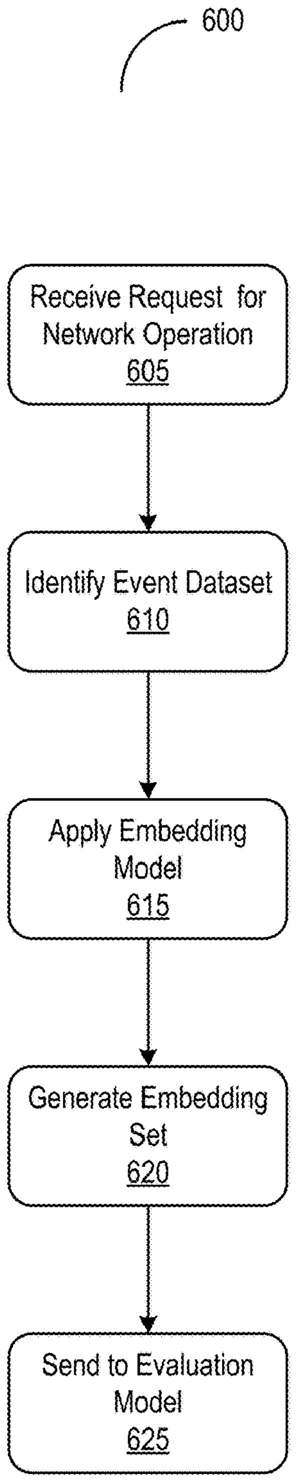
FIG. 6 depicts a flow diagram of a method of generating embeddings indicative of fraudulence from event datasets associated with network operations, in accordance with an embodiment.

FIG. 6 depicts a flow diagram of a method 600 of generating embeddings indicative of fraudulence from event datasets associated with network operations, in accordance with an illustrative embodiment. Embodiments may include additional, fewer, or different operations from those described in the method 600. The method 600 may be performed by a server executing machine-readable software code, though it should be appreciated that the various operations May be performed by one or more computing devices and/or processors. At step 605, a server may receive a request for a network operation from a computing system. The request may indicate execution of the network operation using data provided by a user device to the computing system. The request may include data defining the execution of the network operation. A network operation may represent a transaction between the computing system and the server. Prior to executing the network operation, the server may invoke processes to check whether the computing system exhibits fraudulent behavior.

At step 610, the server may identify an event dataset associated with the network operation, upon receipt of the request. The event dataset may be associated with a network operation, a request for the network operation, a computing system from which the request originates, or a user device in communication with the computing system, among others. The event dataset may include a set of key-value pairs for transaction identifier, timestamp, amount, payment method, current type, status, customer identifier, merchant identifier, item identifier, quantity, geographic location, channel, phone number, email address, mail address (e.g., city, state, and country), network address, device identifier, or device type, among others. In some embodiments, the server may aggregate multiple event datasets over a time period.

At step 615, the server may apply an embedding model to the event dataset. The embedding model may be a transformer-based model to generate embeddings from the text data included in the event dataset. The embedding model may include a tokenization layer, an input embedding layer, a position encoder, an encoder stack, a decoder stack, and an output layer, among others, interconnected with one another. In applying, the server may generate sequence of tokens in an n-dimensional feature space using the strings in the input event dataset. The input embedding layer may generate a set of embeddings using the sequence of tokens. The position encoder may generate positional encodings for each input embedding as a function of a position of the corresponding tokens or by extension the string within the input event dataset. The encoder (or decoder) stack may apply attention and transformation to output a set of embeddings.

At step 620, the server may generate an embedding set based on the application of the embedding model to the event dataset. The embedding set may be indicative of fraudulence (e.g., fraudulent behavior) in the network operation, the request, or on the part of the computing system associated with the event dataset. The embedding set may be a representation of the semantic meaning in a n-dimensional feature space. In some embodiments, the server may generate the embedding set for each event dataset aggregated over the time period. At step 625, the server may send the embedding set to an evaluation model. The evaluation model may use the embedding set to determine a likelihood of fraudulence in the network operation or in the behavior of the computing system.

Figure 7:
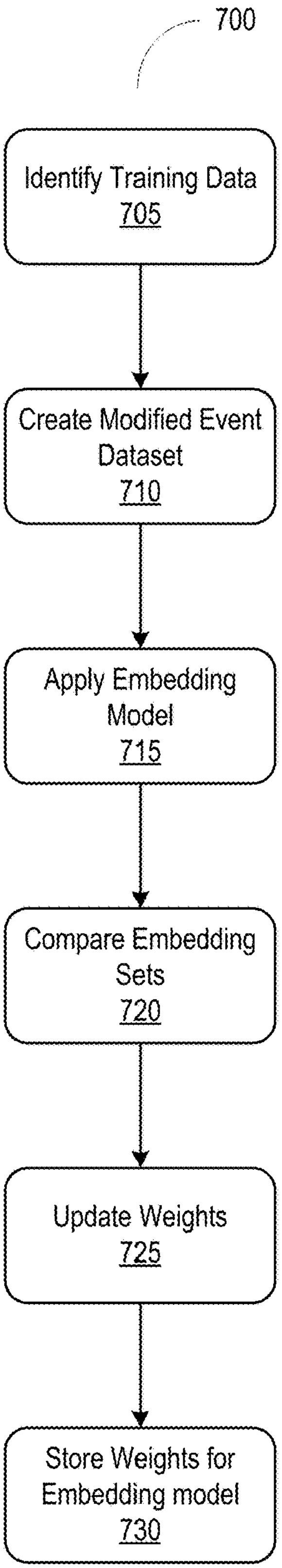
FIG. 7 depicts a flow diagram of a method of training embedding models to generate embeddings from event datasets associated with network operations, in accordance with an embodiment.

FIG. 7 depicts a flow diagram of a method 700 of training embedding models to generate embeddings from event datasets associated with network operations, in accordance with an illustrative embodiment. Embodiments may include additional, fewer, or different operations from those described in the method 700. The method 700 may be performed by a server executing machine-readable software code, though it should be appreciated that the various operations may be performed by one or more computing devices and/or processors. At step 705, a server may identify training data. The training data may include a set of sample event datasets. The sample event datasets for the training data may be generated from previous requests for network operation with the server. The sample event dataset may be associated with a network operation, a request for the network operation, a computing system from which the request originates, or a user device in communication with the computing system, among others. The sample event dataset may include a set of key-value pairs for transaction identifier, timestamp, amount, payment method, current type, status, customer identifier, merchant identifier, item identifier, quantity, geographic location, channel, phone number, email address, mail address (e.g., city, state, and country), network address, device identifier, or device type, among others. In some embodiments, the server may aggregate multiple event datasets over a time period.

At step 710, the server may create a modified event dataset from the original sample event dataset. For contrastive learning, the server may generate the modified event dataset by perturbing a portion of the original sample event dataset. For instance, the server may change a value of one or more alphanumeric characters for a particular field in the original sample event dataset to generate the modified event dataset. For mask learning, the server may generate the modified event dataset by obfuscating a portion of the original sample event dataset. For example, the server may hide a value (e.g., in its entirety) for a particular field in the original sample event dataset to generate the modified event dataset.

At step 715, the server may apply an embedding model to at least one of the original sample event dataset or the modified event data. The embedding model may be a transformer-based model to generate embeddings from the text data included in the input (e.g., at least one of the original sample event dataset or the modified event data). The embedding model may include a tokenization layer, an input embedding layer, a position encoder, an encoder stack, a decoder stack, and an output layer, among others, interconnected with one another. In applying, the server may generate sequence of tokens in an n-dimensional feature space using the strings in the input event dataset. The input embedding layer may generate a set of embeddings using the sequence of tokens. The position encoder may generate positional encodings for each input embedding as a function of a position of the corresponding tokens or by extension the string within the input event dataset. The encoder (or decoder) stack may apply attention and transformation to output a set of embeddings.

At step 720, the server may compare embedding sets generated by the embedding model. For contrastive learning, the server may compare the embedding set generated from the original event dataset with the embedding set generated from the modified event dataset with the perturbed portion to determine a similarity metric. The similarity metric may indicate a degree of semantic similarity between the two embedding sets. For mask learning, the server may compare the embedding set generated from the modified event dataset with the obfuscated portion to determine a reconstruction metric. The reconstruction metric may indicate a degree of deviation (or accuracy) of the embedding in recovering the obfuscated portion from the original sample event dataset.

At step 725, the server may update the one or more weights of the embedding model based on the comparison. The server may update the one or more weights in one or more layers y update the one or more weights of at least one layer (e.g., the tokenization layer, the input embedding layer, the position encoder, the encoder stack, the decoder stack, and the output layer) of the embedding model using the similarity metric or the reconstruction metric, or both. The updating of the weights may be in accordance with a back propagation and optimization function with one or more parameters (e.g., learning rate, momentum, weight decay, and number of iterations). The optimization function may define one or more parameters at which the weights of the embedding model are to be updated. At step 730, the server may store the set of weights for the embedding model. The server may iteratively train the embedding model until convergence. The server may store and maintain the set of weights of the embedding model. The set of weights of the embedding model may be used to generate subsequent embeddings for network operations to evaluate for fraudulence (or malicious or anomalous).

Figure 8:
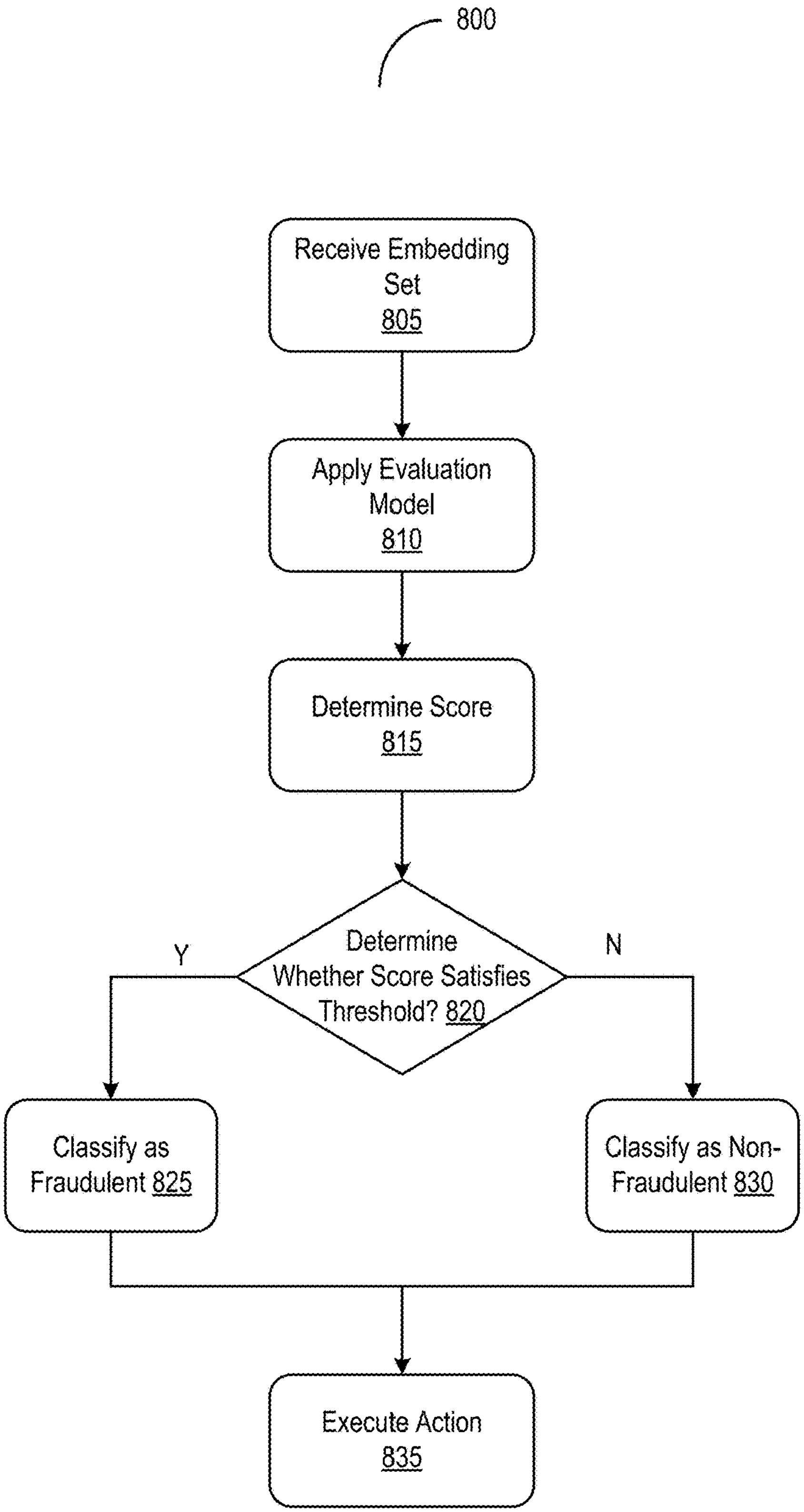
FIG. 8 depicts a flow diagram of a method of detecting fraudulent activities in networked environments using embeddings generated from network events, in accordance with an embodiment.

FIG. 8 depicts a flow diagram of a method 800 of detecting fraudulent activities in networked environments using embeddings generated from network events, in accordance with an illustrative embodiment. Embodiments may include additional, fewer, or different operations from those described in the method 800. The method 800 may be performed by a server executing machine-readable software code, though it should be appreciated that the various operations may be performed by one or more computing devices and/or processors. At step 805, a server may receive an embedding set generated by an embedding model. The embedding set may be indicative of fraudulence (e.g., fraudulent behavior) in the network operation, the request, or on the part of the computing system associated with the event dataset. The embedding set may be a representation of the semantic meaning in a n-dimensional feature space.

At step 810, the server may apply an evaluation model to the embedding set. The evaluation model may be a machine learning model or artificial intelligence algorithm in accordance with any architecture to process the embedding set. The evaluation model may have a set of weights in accordance with the architecture. In applying, the server may process the input embedding set in accordance with the set of weights in the evaluation model. At step 815, the server may determine a score based on the application of the evaluation model to the embedding set. The score may indicate a likelihood of fraudulent behavior by the computing system associated with the event datasets used to generate the embedding set.

At step 820, the server may determine whether the score satisfies a threshold. The threshold may delineate or define a value for the score at which to determine whether the behavior exhibited by the computing system is fraudulent or non-fraudulent. Based on the determination, the server may select an action to execute on the network operation.

At step 825, if the score is determined to satisfy the threshold, the server may classify the behavior as fraudulent. The server may also select the action to restrict the execution on the network operation, such as by blocking further processing of the network operation or sending an alert to a network administrator.

At step 830, if the score is determined to not satisfy the threshold, the server may classify the behavior as non-fraudulent. The server may select the action to permit the execution of the network operation.

At step 820, the server may execute the action on the network operation. When the action is to permit, the server may allow the network operation to be executed. In executing the network operation, the server may carry out the requested transaction may be for the merchant entity associated with the computing system. The requested transaction may include, for instance, a database query, a read/write command, a request for payment, a transfer request, a file request, or an information request, among others. Conversely, when the action is to restrict, the server may block the execution of the network operation. The server may remove the network operation from a queue to prevent further processing.

Figure 9:
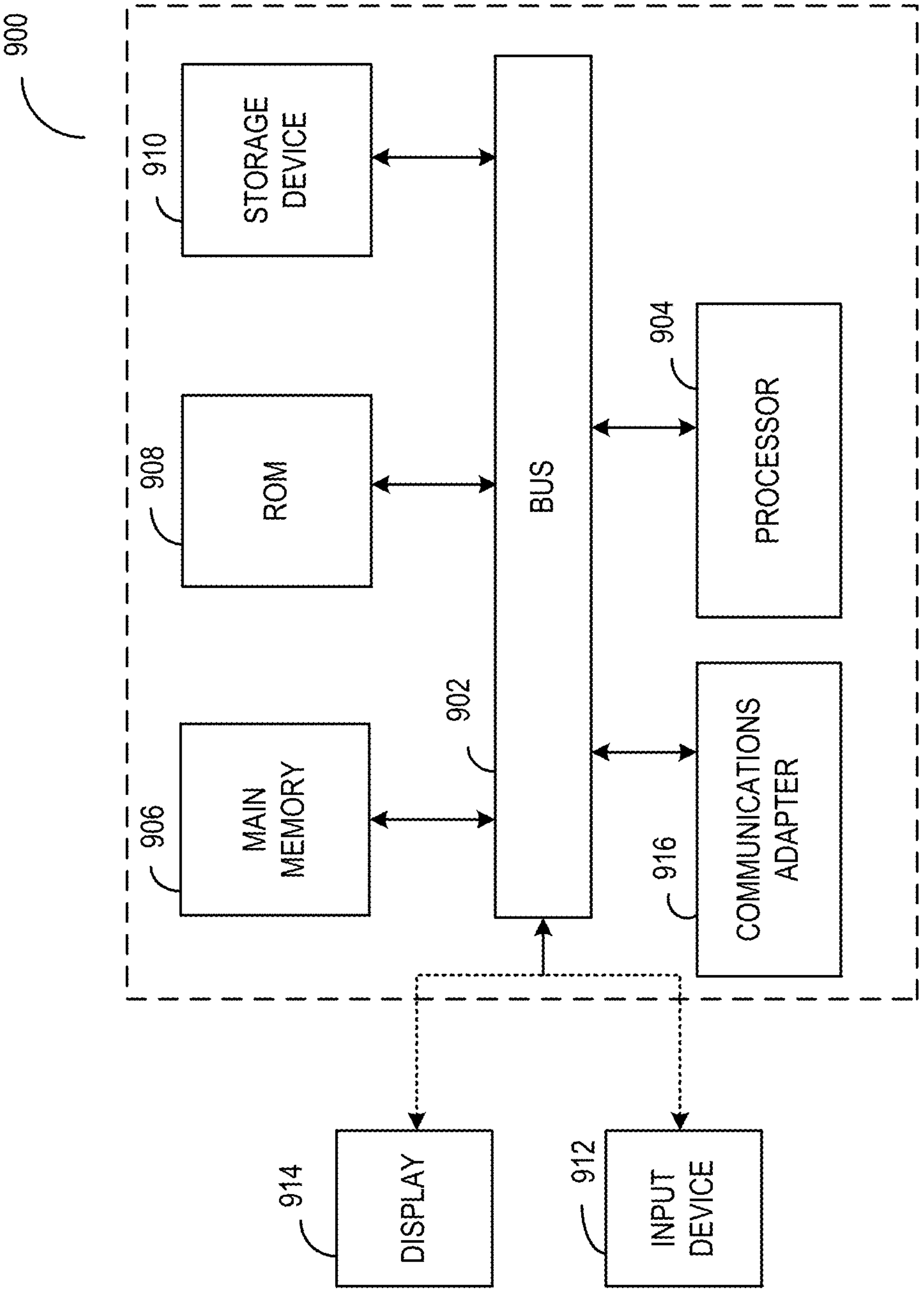
FIG. 9 illustrates a component diagram of an example computing system suitable for use in the various implementations described herein, in accordance with an embodiment.

FIG. 9 is a component diagram of an example computing system suitable for use in the various implementations described herein, according to an example implementation. One or more steps of the methods and processes discussed herein can be performed by the computing system depicted in FIG. 9. The computing system 900 includes a bus 902 or other communication component for communicating information and a processor 904 coupled to the bus 902 for processing information. The computing system 900 also includes main memory 906, such as a RAM or other dynamic storage device, coupled to the bus 902 for storing information, and instructions to be executed by the processor 904. Main memory 906 can also be used for storing position information, temporary variables, or other intermediate information during the execution of instructions by the processor 904. The computing system 900 may further include a ROM 908 or other static storage device coupled to the bus 902 for storing static information and instructions for the processor 904. A storage device 910, such as a solid-state device, magnetic disk, or optical disk, is coupled to the bus 902 for persistently storing information and instructions.

The computing system 900 may be coupled via the bus 902 to a display 914, such as a liquid crystal display, or active-matrix display, for displaying information to a user. An input device 912, such as a keyboard including alphanumeric and other keys, may be coupled to the bus 902 for communicating information, and command selections to the processor 904. In another implementation, the input device 912 has a touchscreen display. The input device 912 can include any type of biometric sensor, or a cursor control, such as a mouse, a trackball, or cursor direction keys, for communicating direction information and command selections to the processor 904 and for controlling cursor movement on the display 914.

In some implementations, the computing system 900 may include a communications adapter 916, such as a networking adapter. Communications adapter 916 may be coupled to bus 902 and may be configured to enable communications with a computing or communications network or other computing systems. In various illustrative implementations, any type of networking configuration may be achieved using communications adapter 916, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 900 in response to the processor 904 executing an implementation of instructions contained in main memory 906. Such instructions can be read into main memory 906 from another computer-readable medium, such as the storage device 910. Execution of the implementation of instructions contained in main memory 906 causes the computing system 900 to perform the illustrative processes described herein. One or more processors in a multi-processing implementation may also be employed to execute the instructions contained in the main memory 906. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method of generating embeddings for network events to detect fraudulent activities in networked environments, comprising:
- receiving, by one or more processors, a request to execute a first network operation in a network environment;
- identifying, by the one or more processors, an event dataset associated with the first network operation to be executed;
- applying, by the one or more processors, the first event dataset to a first machine learning (ML) model comprising a plurality of weights, wherein the first ML model is established by:
  - identifying training data comprising (i) a first sample event dataset associated with a second network operation and (ii) a second sample event dataset corresponding to a modification of a portion of the first sample event dataset;
  - generating, by applying to the first ML model, (i) a first plurality of embeddings using the first sample event dataset and (ii) a second plurality of embeddings using the second sample event dataset;
  - comparing the first plurality of embeddings with the second plurality of embeddings to generate a similarity metric; and
  - updating at least one of the plurality of weights of the first ML model based on the similarity metric;
- generating, by the one or more processors, based on applying the event dataset of the first network operation to the ML model, a plurality of embeddings indicative of fraudulence of the first network operation; and
- sending, by the one or more processors, the plurality of embeddings to a second ML model to determine a likelihood of fraudulence in the first network operation.

2. The method of claim 1, wherein the first ML model is established by:
- identifying second training data comprising a third sample event dataset comprising an obfuscation of a portion of a fourth sample event dataset associated with a third network operation;
- generating, by applying to the first ML model, a third plurality of embeddings using the third sample event dataset;
- comparing the third plurality of embeddings with the portion of the fourth sample event dataset to determine a reconstruction metric; and
- updating at least one of the plurality of weights of the first ML model in accordance with the reconstruction metric.

3. The method of claim 1, wherein applying the first event dataset to the first ML model further comprises generating, using a tokenizer of the first ML model, a sequence of tokens using the first event dataset; and
- wherein generating the plurality of embedding further comprises generating, based on providing the sequence of tokens to the first ML model in at least one of an encoder architecture or decoder architecture, the plurality of embeddings.

4. The method of claim 1, wherein identifying the event dataset further comprises retrieving a plurality of event datasets associated with the network operation over a time period prior to receipt of the request to execute the network operation, and
- wherein generating the plurality of embeddings further comprises generating, based on applying the plurality of event datasets to the first ML model, a sequence of embedding sets, each of the embedding sets comprising a respective plurality of embeddings for a corresponding event dataset of the plurality of datasets.

5. The method of claim 1, wherein receiving the request further comprises receiving, from a computing system, the request to execute the first network operation, and
- wherein identifying the event dataset comprising retrieving the event dataset comprising a plurality of records identifying network activities associated with the computing system.

6. The method of claim 1, wherein generating the plurality of embeddings further comprises generating the plurality of embeddings corresponding to a semantic representation of the event dataset associated with the first network operation.

7. The method of claim 1, further comprising:
- determining, by the one or more processors, responsive to sending the plurality of embedding to the second ML model, a classification indicating one of non-fraudulent or fraudulence of the first network operation; and
- executing, by the one or more processors, the first network operation in accordance with the classification.

8. A method of training machine learning (ML) models to generate embeddings for network events to detect fraudulent activities in networked environments, comprising:

identifying, by one or more processors, training data comprising (i) a first sample event dataset associated with a second network operation and (ii) a second sample event dataset corresponding to a modification of a portion of the first sample event dataset;

generating, by the one or more processors, based on applying to a first ML model comprising a plurality of weights, (i) a first plurality of embeddings using the first sample event dataset and (ii) a second plurality of embeddings using the second sample event dataset;

comparing, by the one or more processors, the first plurality of embeddings with the second plurality of embeddings to generate a similarity metric; and updating, by the one or more processors, at least one of the plurality of weights of the first ML model based on the similarity metric; and storing, by the one or more processors, the plurality of weights of the first ML model to generate a second plurality of embeddings for a second network operation to be provided to a second ML model to determine a likelihood of fraudulence in the second network operation.

9. The method of claim 8, further comprising identifying, by the one or more processors, second training data comprising a third sample event dataset comprising an obfuscation of a portion of a fourth sample event dataset associated with a third network operation;

generating, by the one or more processors, by applying to the first ML model, a third plurality of embeddings using the third sample event dataset;

comparing, by the one or more processors, the third plurality of embeddings with the portion of the fourth sample event dataset to determine a reconstruction metric; and updating, by the one or more processors, at least one of the plurality of weights of the first ML model in accordance with the reconstruction metric.

10. The method of claim 9, wherein comparing the third plurality of embeddings with the portion of the fourth sample event dataset further comprises determining the reconstruction metric in accordance with a linear probe.

11. The method of claim 8, further comprising:

generating, by the one or more processors, based on applying the first ML model to a plurality of event datasets associated with network operations, a plurality of clusters including (i) a first cluster corresponding to first embedding sets labeled as fraudulent and (ii) a second cluster corresponding to second embedding sets labeled as non-fraudulent; and training, by the one or more processors, the second ML model to determine likelihoods of frauds in the network operations, using the plurality of clusters.

12. The method of claim 8, wherein comparing the first plurality of embeddings with the second plurality of embeddings further comprises determining the similarity metric in accordance with at least one of an entropy function, a covariance function, or a linear probe.

13. The method of claim 8, wherein updating at least one of the plurality of weights further comprises updating at least one of the plurality of weights of a tokenizer in the first ML model to generate embeddings indicative of fraudulence in network operations.

14. A system for generating embeddings for network events to detect fraudulent activities in networked environments, comprising:

one or more processors coupled with memory, configured to:

receive a request to execute a first network operation in a network environment;

identify an event dataset associated with the first network operation to be executed;

apply the first event dataset to a first machine learning (ML) model comprising a plurality of weights, wherein the first ML model is established by:

identifying training data comprising (i) a first sample event dataset associated with a second network operation and (ii) a second sample event dataset corresponding to a modification of a portion of the first sample event dataset;

generating, by applying to the first ML model, (i) a first plurality of embeddings using the first sample event dataset and (ii) a second plurality of embeddings using the second sample event dataset;

comparing the first plurality of embeddings with the second plurality of embeddings to generate a similarity metric; and updating at least one of the plurality of weights of the first ML model based on the similarity metric;

generate, based on applying the event dataset of the first network operation to the ML model, a plurality of embeddings indicative of fraudulence of the first network operation; and send the plurality of embeddings to a second ML model to determine a likelihood of fraudulence in the first network operation.

15. The system of claim 14, wherein the first ML model is established by:

identifying second training data comprising a third sample event dataset comprising an obfuscation of a portion of a fourth sample event dataset associated with a third network operation;

generating, by applying to the first ML model, a third plurality of embeddings using the third sample event dataset;

comparing the third plurality of embeddings with the portion of the fourth sample event dataset to determine a reconstruction metric; and updating at least one of the plurality of weights of the first ML model in accordance with the reconstruction metric.

16. The system of claim 14, wherein the one or more processors are further configured to:

generate, using a tokenizer of the first ML model, a sequence of tokens using the first event dataset; and generate, based on providing the sequence of tokens to the first ML model in at least one of an encoder architecture or decoder architecture, the plurality of embeddings.

17. The system of claim 14, wherein the one or more processors are further configured to retrieve a plurality of event datasets associated with the network operation over a time period prior to receipt of the request to execute the network operation, and generate, based on applying the plurality of event datasets to the first ML model, a sequence of embedding sets, each of the embedding sets comprising a respective plurality of embeddings for a corresponding event dataset of the plurality of datasets.

18. The system of claim 14, wherein the one or more processors are further configured to:

receive, from a computing system, the request to execute the first network operation, and retrieve the event dataset comprising a plurality of records identifying network activities associated with the computing system.

19. The system of claim 14, wherein the one or more processors are further configured to generate the plurality of embeddings corresponding to a semantic representation of the event dataset associated with the first network operation.

20. The system of claim 14, wherein the one or more processors are further configured to:

determine, responsive to sending the plurality of embedding to the second ML model, a classification indicating one of non-fraudulent or fraudulence of the first network operation; and execute the first network operation in accordance with the classification.

* * * * *